(12) United States Patent
Mimura

(10) Patent No.: US 9,372,288 B2
(45) Date of Patent: Jun. 21, 2016

(54) CUBE-CORNER RETROREFLECTIVE SHEETING

(75) Inventor: Ikuo Mimura, Minato-ku (JP)

(73) Assignee: NIPPON CARBIDE INDUSTRIES CO., INC., Tokyo (JP)

(*) Notice: Subject to any disclaimer, the term of this patent is extended or adjusted under 35 U.S.C. 154(b) by 184 days.

(21) Appl. No.: 13/881,196

(22) PCT Filed: Oct. 27, 2011

(86) PCT No.: PCT/JP2011/074882
§ 371 (c)(1),
(2), (4) Date: Apr. 24, 2013

(87) PCT Pub. No.: WO2012/057295
PCT Pub. Date: May 3, 2012

(65) Prior Publication Data
US 2013/0215509 A1    Aug. 22, 2013

(30) Foreign Application Priority Data

Oct. 29, 2010 (JP) ................................. 2010-243092

(51) Int. Cl.
*G02B 5/122* (2006.01)
*G02B 5/124* (2006.01)
*G02B 5/136* (2006.01)

(52) U.S. Cl.
CPC ............... *G02B 5/122* (2013.01); *G02B 5/124* (2013.01); *G02B 5/136* (2013.01)

(58) Field of Classification Search
CPC .......... G02B 5/124; G02B 5/04; G02B 5/045; G02B 5/122; G02B 5/128; G02B 19/0028; G02B 5/12; G02B 6/0053; G02B 5/0231; G02B 5/0278; G02B 7/1805; G02B 17/008; G02B 27/126; G02B 13/0065; G02B 19/0014; G02B 23/02; G02B 27/0972
USPC .......... 359/529–533, 831, 833–834, 836–837
See application file for complete search history.

(56) References Cited

U.S. PATENT DOCUMENTS

| 3,417,959 A | 12/1968 | Schultz |
| 3,458,245 A | 7/1969 | Stanley |

(Continued)

FOREIGN PATENT DOCUMENTS

| CN | 1214120 | 4/1999 |
| JP | 46-25177 | 7/1971 |

(Continued)

*Primary Examiner* — James Greece
*Assistant Examiner* — Sharrief Broome
(74) *Attorney, Agent, or Firm* — Fitzpatrick, Cella, Harper & Scinto

(57) ABSTRACT

In cube-corner retroreflective sheeting 3, cube-corner retroreflective elements in at least two mutually adjacent regions A and B rotate with each other around an axis perpendicular to the sheeting, in which cube-corner retroreflective elements 11 and 12 not in contact with boundaries between the regions A and B are cube-corner retroreflective elements having a hexagonal shape, and cube-corner retroreflective elements 11*s*, 12*s*, 11*t* and 12*t* in contact with the boundaries between the regions A and B are cube-corner retroreflective elements having a shape obtained by cutting parts of one or two reflective lateral surfaces of the cube-corner retroreflective element having a hexagonal shape where the partly cut reflective lateral surfaces are in contact with the boundaries.

12 Claims, 10 Drawing Sheets

(56) References Cited

U.S. PATENT DOCUMENTS

| | | |
|---|---|---|
| 3,541,606 A | 11/1970 | Heenan et al. |
| 3,741,623 A * | 6/1973 | Mihalik .................. 359/528 |
| 3,922,065 A | 11/1975 | Schultz |
| 3,924,929 A | 12/1975 | Holmen et al. |
| 5,936,770 A | 8/1999 | Nestegard et al. |
| 6,080,340 A | 6/2000 | Benson et al. |
| 6,819,507 B2 | 11/2004 | Minoura et al. |
| 7,445,347 B2 | 11/2008 | Couzin |
| 7,815,319 B2 | 10/2010 | Mimura |
| 2003/0133194 A1 | 7/2003 | Benson et al. |
| 2004/0114244 A1 | 6/2004 | Couzin |
| 2005/0018292 A1 * | 1/2005 | Mimura ................ G02B 5/124 359/529 |
| 2009/0296216 A1 | 12/2009 | Mimura |

FOREIGN PATENT DOCUMENTS

| | | |
|---|---|---|
| JP | 63-109233 | 5/1988 |
| JP | 09-504384 | 4/1997 |
| JP | 2006-510951 | 3/2006 |
| TW | 1298810 | 7/2008 |
| WO | 00/60385 | 10/2000 |
| WO | 2007/142356 | 12/2007 |

* cited by examiner

CUBE-CORNER RETROREFLECTIVE SHEETING

This application is a National Phase of PCT Application No. PCT/JP2011/074882 filed Oct. 27, 2011), which in turn claims benefit of Japanese Application No. 2010-243092 filed Oct. 29, 2010.

TECHNICAL FIELD

The present invention relates to cube-corner retroreflective sheeting, and particularly relates to cube-corner retroreflective sheeting that is excellent in rotation angle characteristics and excellent in design.

BACKGROUND ART

Retroreflective sheeting that reflects light in substantially the same direction as the incident direction has been used for signs such as road traffic signs and construction signs, vehicle registration plates, safety materials such as helmets and life preservers, markings such as those on signboards, and others. Hexagonal cube-corner retroreflective sheeting that is excellent in light reflective efficiency is known as one example of the retroreflective sheeting.

In producing the hexagonal cube-corner retroreflective sheeting, respective hexagonal cube-corner retroreflective elements are formed by die molding. Specifically, hexagonal cube-corner retroreflective sheeting having a large area is formed by using a die assembly including a plurality of dies in each of which the shapes of hexagonal cube-corner retroreflective elements are arranged in a closest-packed state.

Patent Documents 1 to 4 listed below teach cube-corner retroreflective sheeting produced by using a die assembly including a plurality of dies.

In the hexagonal cube-corner retroreflective sheeting taught in Patent Documents 1 and 2, boundaries between dies in the assembly are provided along edge lines of hexagonal cube-corner retroreflective elements. Accordingly, boundaries between regions corresponding to respective dies in produced hexagonal cube-corner retroreflective sheeting are also along the edge lines of hexagonal cube-corner retroreflective elements. Furthermore, the hexagonal cube-corner retroreflective elements are oriented in the same direction in each die as those in the other dies in the assembly. Accordingly, the hexagonal cube-corner retroreflective elements are oriented in the same direction over the entire produced hexagonal cube-corner retroreflective sheeting.

In the method for manufacturing hexagonal cube-corner retroreflective sheeting taught in Patent Document 3, a die assembly includes a plurality of dies having a triangular or quadrangular shape and the die assembly is used to form hexagonal cube-corner retroreflective sheeting. There is no disclosure as the specifically what direction each of the dies for hexagonal cube-corner retroreflective elements is oriented in the die assembly.

In addition, in the method of manufacturing hexagonal cube-corner retroreflective sheeting taught in Patent Document 4, a die assembly includes a plurality of dies in which each boundary therebetween is provided along an edge line of a hexagonal cube-corner retroreflective element and the die assembly is used to form hexagonal cube-corner retroreflective sheeting, or a die assembly including a plurality of dies having a triangular or quadrangular shape and the die assembly is used to form hexagonal cube-corner retroreflective sheeting.

It is known that hexagonal cube-corner retroreflective sheeting has rotation angle characteristics that turning the retroreflective sheeting on a plane relative to a light incident direction in a state in which light is incident on the surface of the retroreflective sheeting in an oblique direction changes the light reflective efficiency according to the turning angle of the light incident direction with respect to the retroreflective sheeting.

In order to improve such rotation angle characteristics, hexagonal cube-corner retroreflective sheeting including two or more types of hexagonal cube-corner retroreflective elements having a relationship in which the retroreflective elements rotate with each other around an axis perpendicular to the surface of the retroreflective sheeting has been proposed.

Hexagonal cube-corner retroreflective sheeting taught in Patent Documents 5 to 7 has a plurality of regions in which hexagonal cube-corner retroreflective elements formed in regions adjacent to each other are oriented in directions rotated by 180 degrees with respect to each other. According to the hexagonal cube-corner retroreflective sheeting taught in Patent Documents 5 to 7, since the rotation angle characteristics of mutually adjacent regions differ by 180 degrees, the reflection characteristics for light incident in directions different from one another by 180 degrees are improved in the retroreflective sheeting as a whole. Thus, the rotation angle characteristics of 180 degrees are improved in the retroreflective sheeting as a whole.

[Patent Document 1] U.S. Pat. No. 3,417,959
[Patent Document 2] U.S. Pat. No. 3,922,065
[Patent Document 3] U.S. Pat. No. 3,924,929
[Patent Document 4] Japanese Examined Patent Publication No. 46-25177
[Patent Document 5] U.S. Pat. No. 3,458,245
[Patent Document 6] U.S. Pat. No. 3,541,606
[Patent Document 7] Japanese Unexamined Utility Model Publication No. 63-109233

SUMMARY OF INVENTION

Objects To Be Achieved By The Invention

In the hexagonal cube-corner retroreflective sheeting produced by the method for producing hexagonal cube-corner retroreflective sheeting taught in Patent Documents 1 to 4, the rotation angle characteristics are not improved because the hexagonal cube-corner retroreflective elements are oriented in the same direction over the entire hexagonal cube-corner retroreflective sheeting.

In the hexagonal cube-corner retroreflective sheeting taught in Patent Documents 5 to 7, on the other hand, the boundaries between the regions in which the hexagonal cube-corner retroreflective elements oriented in directions different from one another by 180 degrees are formed become conspicuous. This is because a retroreflective element adjacent to a boundary is not formed or a reflective element adjacent to a boundary does not have retroreflectivity. For example, in the hexagonal cube-corner retroreflective sheeting taught in Patent Document 5, a retroreflective element is in contact with a boundary on the other side thereof. In Patent Documents 6 and 7, no reflective elements that produce retroreflection are in contact with boundaries between the regions. Appropriate retroreflected light cannot therefore be obtained around the boundaries between the regions, which results in low brightness around the boundaries. As a result, the hexagonal cube-corner retroreflective sheeting taught in Patent Documents 5 to 7 has a problem that the boundaries between the regions become conspicuous, which is inferior in design although the rotation angle is improved.

It is therefore an object of the present invention to provide cube-corner retroreflective sheeting that is excellent in rotation angle characteristics and excellent in design.

Means For Achieving The Objects

The inventors have examined a method for making boundaries between regions less conspicuous by using only hexagonal cube-corner retroreflective elements having excellent retroreflection characteristics. It is found, however, that elements that do not produce retroreflection are formed at boundaries between regions in which only hexagonal cube-corner retroreflective elements that are oriented in different directions from each other and the boundaries cannot be made less conspicuous. The inventors therefore have further conducted intensive studies and achieved cube-corner retroreflective sheeting using hexagonal cube-corner retroreflective elements according to the present invention.

Specifically, cube-corner retroreflective sheeting according to the present invention is cube-corner retroreflective sheeting having a plurality of regions in which cube-corner retroreflective elements are arranged in a closest-packed state, where the respective cube-corner retroreflective elements in at least two mutually adjacent regions rotate with each other around an axis perpendicular to the sheeting, the cube-corner retroreflective element that is not in contact with the respective boundaries between the regions is a cube-corner retroreflective element in which three quadrangular reflective lateral surfaces perpendicular to one another have one apex in common, the cube-corner retroreflective element having three edge lines each being one common side of the mutually adjacent reflective lateral surfaces and having a hexagonal shape by sides of the respective reflective lateral surfaces that are not common sides of mutually adjacent reflective lateral surfaces, and the cube-corner retroreflective element in contact with the respective boundary between the regions is a cube-corner retroreflective element having a shape obtained by cutting part of one or two reflective lateral surfaces of the cube-corner retroreflective element having the hexagonal shape in which the partly cut reflective lateral surfaces are in contact with the boundary.

According to such hexagonal cube-corner retroreflective sheeting, the cube-corner retroreflective elements formed in the respective regions are hexagonal cube-corner retroreflective elements having excellent reflection characteristics. In addition, since cube-corner retroreflective elements in at least two regions adjacent to each other have a relation in which the retroreflective elements rotate with each other around an axis perpendicular to the sheeting, the regions have different rotation angle characteristics from each other. The rotation angle characteristics can therefore be improved in the cube-corner retroreflective sheeting as a whole.

In addition, the cube-corner retroreflective elements in contact with a boundary between the regions are cube-corner retroreflective elements having a shape obtained by cutting part of one or two reflective lateral surfaces of each cube-corner retroreflective element having the hexagonal shape in which the partly cut reflective lateral surfaces are in contact with the boundary. Since such cube-corner retroreflective elements are arranged with the hexagonal cube-corner retroreflective elements described above in a closest-packed state, the cube-corner retroreflective elements can be arranged in a closest-packed state at the boundaries. The cube-corner retroreflective elements in contact with the boundaries each have three reflective lateral surfaces although parts of some reflective lateral surfaces are cut off. therefore, even when light is incident around the boundaries between the respective regions, the light is reflected by the three reflective lateral surfaces of each of the cube-corner retroreflective elements in contact with the boundaries and emitted as retroreflected light. Even when light is incident over a plurality of regions in this manner, it is possible to prevent the brightness around the boundaries from becoming lower and make the boundaries less conspicuous since the retroreflective elements are in contact with the boundaries. As a result, excellent design can be achieved according to the cube-corner retroreflective sheeting according to the present invention.

Note that, when the area of the regions having different rotation angle characteristics from each other are large in the cube-corner retroreflective sheeting, the regions can be distinguished by visual observation. This is because the brightness of reflected light may vary due to the difference in rotation angle characteristics between the regions. In order that the respective regions cannot be distinguished in this manner by visual observation and that the cube-corner retroreflective sheeting has integrity as a whole, the areas of the respective regions may be made smaller and the small regions may be arranged over the entire cube-corner retroreflective sheeting. In such a case, however, the number of boundaries between the respective regions increases in the cube-corner retroreflective sheeting as a whole. According to the cube-corner retroreflective sheeting according to the present invention, however, it is possible to prevent the retroreflection characteristics of the cube-corner retroreflective sheeting as a whole from lowering even when the regions having small area are arranged over the entire cube-corner retroreflective sheeting since the cube-corner retroreflective elements in contact with the boundaries do not low retroreflectivity.

In the cube-corner retroreflective sheeting described above, a surface in contact with the boundary in each cube-corner retroreflective element in contact with the boundary is preferably a surface formed of a triangle obtained by cutting the reflective lateral surface along a line connecting common apexes of only two reflective lateral surfaces, the apexes being opposed to each other.

In the cube-corner retroreflective sheeting, it is also possible to present the brightness around the boundaries from becoming lower and make the boundaries less conspicuous since the retroreflective elements are in contact with the boundaries.

Alternatively, in the cube-corner retroreflective sheeting described above, a surface in contact with the boundary in each cube-corner retroreflective element in contact with the boundary is preferably a surface containing a pentagon obtained by cutting the reflective lateral surface along a line connecting respective points on two sides that are not the edge lines with each other.

In such cube-corner retroreflective sheeting, the surface in contact with the boundary may be a reflective lateral surface containing a pentagon obtained by cutting along a line connecting respective points on two sides that are not the edge lines in which the regions in contact with the two sides that are not the edge lines also contribute to retroreflection. Therefore, the areas of the reflective lateral surfaces in contact with the boundaries can be made larger, a decrease in reflective efficiency around the boundaries can be made smaller, and a decrease in brightness around the boundaries can be made smaller. As a result, cube-corner retroreflective sheeting that can make the boundaries less conspicuous and that is further excellent in design can be achieved.

In the cube-corner retroreflective sheeting described above, only one reflective lateral surface of each of the cube-corner retroreflective elements in contact with the boundary may be in contact with the boundary.

In the cube-corner retroreflective sheeting, the boundary can be made straight.

Alternatively, in the cube-corner retroreflective sheeting described above, two reflective lateral surfaces of each of the cube-corner retroreflective elements in contact with the boundary may be in contact with the boundary.

In the cube-corner retroreflective sheeting, since two reflective lateral surfaces of a cube-corner retroreflective element in contact with the boundary between the regions are cut, and the two triangular reflective lateral surfaces are in contact with the boundary, the boundary can be made curved along the two reflective lateral surfaces.

Still alternatively, in the cube-corner retroreflective sheeting described above, only one reflective lateral surface of each of some cube-corner retroreflective elements in contact with the boundary may be in contact with the boundary, and two reflective lateral surfaces of each of some other cube-corner retroreflective elements in contact with the boundary may be in contact with the boundary.

In such retroreflective sheeting, a part of the boundary can be made straight along the line along which a part of one reflective lateral surface is cut and another part of the boundary can be made curved along the respective lines along which parts of two reflective lateral surfaces are cut. Therefore, the regions can be made in a triangular shape, a hexagonal shape, and so on, and further excellent design can be achieved.

Furthermore, in the cube-corner retroreflective sheeting described above, the boundary is preferably parallel to a line connecting common apexes of only two reflective lateral surfaces of the cube-corner retroreflective element having the hexagonal shape.

In such cube-corner retroreflective sheeting, settings of boundaries with no gap between the regions can be made easy by making the boundaries between the regions parallel to lines connecting common apexes of only two reflective lateral surfaces in the hexagonal cube-corner retroreflective elements.

In the cube-corner retroreflective sheeting described above, the three edge lines of the cube-corner retroreflective element having the hexagonal shape preferably have the equal length to one another.

In such hexagonal cube-corner retroreflective sheeting, each hexagonal cube-corner retroreflective element can be an element having a so-called regular hexagonal shape. Hexagonal cube-corner retroreflective sheeting in which such elements oriented in the same direction are arranged in a closest-packed state is preferable because such sheeting is excellent in rotation angle characteristics.

Furthermore, in the cube-corner retroreflective sheeting described above, the cube-corner retroreflective elements having the hexagonal shape in mutually adjacent regions preferably rotate relative to each other by an odd multiple of 60 degrees around an axis perpendicular to the sheeting.

According to such hexagonal cube-corner retroreflective sheeting, the directions in which the hexagonal cube-corner retroreflective elements are arranged in the respective regions can be made symmetric, which can further improve the design.

In the cube-corner retroreflective sheeting described above, at least one out of the three edge lines of the cube-corner retroreflective element having the hexagonal shape may have a length different from those of the other edge lines.

Furthermore, in the cube-corner retroreflective sheeting described above, the cube-corner retroreflective elements having the hexagonal shape in mutually adjacent regions preferably rotate relative to each other by 180 degrees around an axis perpendicular to the sheeting.

According to such hexagonal cube-corner retroreflective sheeting, the directions in which the hexagonal cube-corner retroreflective elements are arranged in the respective regions can be made symmetric, which can further improve the design.

In the cube-corner retroreflective sheeting described above, apical angles of the cube-corner retroreflective elements in respective regions are preferably deviated.

Such cube-corner retroreflective sheeting can have excellent observation angle characteristics since the direction in which light is emitted is slightly deviated from the incident direction of light by the hexagonal cube-corner retroreflective elements with deviated apical angles.

In the cube-corner retroreflective sheeting described above, at least one of the quadrangular reflective lateral surfaces is preferably divided into an upper reflective lateral sub-surface and a lower reflective lateral sub-surface along a line connecting common apexes of only two of the quadrangular reflective lateral surfaces with each other, and the upper reflective lateral sub-surface and the lower reflective lateral sub-surface are preferably not on the same plane as each other.

According to the hexagonal cube-corner retroreflective sheeting, light reflected by the three reflective lateral surfaces is reflected only by the upper reflective lateral sub-surface, by combination of the upper reflective lateral sub-surface and the lower reflective lateral sub-surface, or only by the lower reflective lateral sub-surface. Since the upper reflective lateral sub-surface and the lower reflective lateral sub-surface are not on the same plane, light incident at an angle can be emitted at slightly different angles, which provides excellent observation angle characteristics.

Effect Of The Invention

As described above, according to the present invention, cube-corner retroreflective sheeting that is excellent in rotation angle characteristics and excellent in design is provided.

EMBODIMENT OF THE INVENTION

Preferred embodiments of cube-corner retroreflective sheeting according to the present invention will be described below with reference to the drawings.

(First Embodiment)

FIG. 1 shows enlarged views of hexagonal cube-corner retroreflective elements in cube-corner retroreflective sheeting according to a first embodiment of the present invention. As shown in (A) and (B) of FIG. 1, the cube-corner retroreflective elements in the present embodiment are hexagonal cube-corner retroreflective elements.

Figure 1A:
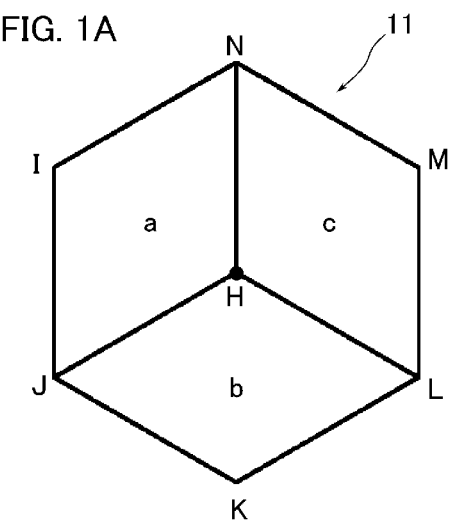
FIG. 1 shows enlarged views of hexagonal cube-corner retroreflective elements in cube-corner retroreflective sheeting according to a first embodiment of the present invention.

As shown in FIG. 1(A), a hexagonal cube-corner retroreflective element 11 has three quadrangular reflective lateral surfaces a, b and c that are congruent. The reflective lateral surface a is a square having apexes H, N, I and J, the reflective lateral surface b is a square having apexes H, J, K and L, and the reflective lateral surface c is a square having apexes H, L, M and N. The reflective lateral surfaces a, b and c therefore has one apex H in common. That is, the apex H is an apex of a cube-corner retroreflective element that three reflective lateral surfaces have in common. In addition, the adjacent reflective lateral surfaces a and b have one side HJ in common, the adjacent reflective lateral surfaces b and c have one side HL in common, the adjacent reflective lateral surfaces c and a have on side HN in common, and the respective sides that the reflective lateral surfaces a, b and c have in common form three edge lines HL, HJ and HN. The sides of the respective reflective lateral surfaces a, b and c that do not form the edge lines, that is, the sides that two adjacent reflective lateral surfaces do not have in common form six outer circumferential sides IJ, JK, KL, LM, MN and NI, which form a regular hexagonal shape. In this manner, the hexagonal cube-corner retroreflective element 11 is a hexagonal cube-corner retroreflective element having a regular hexagonal shape when viewed from the front.

Figure 1B:
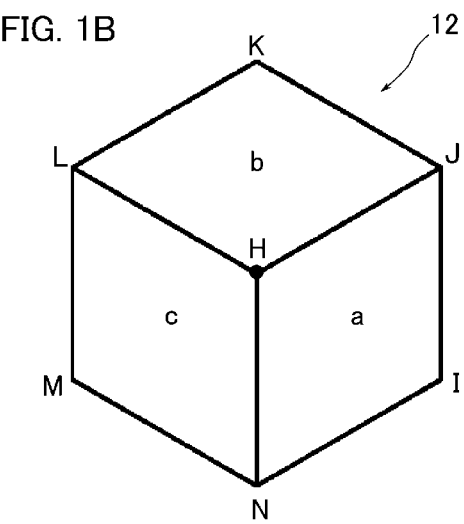

In FIG. 1(B), a hexagonal cube-corner retroreflective element 12 has a shape obtained by rotating the hexagonal cube-corner retroreflective element 11 shown in FIG. 1(A) by 180 degrees around an axis perpendicular to the sheeting. Since the hexagonal cube-corner retroreflective element 11 shown in FIG. 1(A) has a regular hexagonal shape as described above, the hexagonal cube-corner retroreflective element 12 shown in FIG. 1(B) is obtained by rotating each hexagonal cube-corner retroreflective element 11 of FIG. 1(A) about an axis perpendicular to the sheeting by an odd multiple of 60 degrees. In these cases, the appearances are the same even when the positions of the reflective lateral surfaces a, b and c are different from those in FIG. 1(B).

In (A) and (B) of FIG. 1 and subsequent figures, the apex H is represented by a black circle for easy understanding.

Figure 2A:
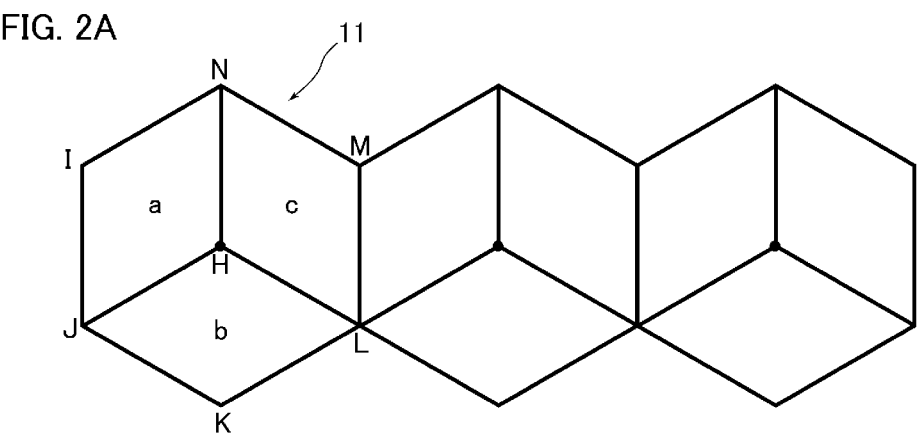
FIG. 2 shows views in which the hexagonal cube-corner retroreflective elements shown in FIG. 1 are arranged.

FIG. 2 shows views in which the hexagonal cube-corner retroreflective elements in FIG. 1 are arranged. FIG. 2(A) shows three hexagonal cube-corner retroreflective elements 11 shown in FIG. 1(A) arranged in a row. When the hexagonal cube-corner retroreflective elements 11 are arranged in this manner, a side that two adjacent reflective lateral surfaces do not have in common is a common mutually side of adjacent hexagonal cube-corner retroreflective elements 11. In other words, as shown in FIG. 2(A), for example, one outer circumferential side ML of one hexagonal cube-corner retroreflective element 11 and one outer circumferential side IJ (not shown) of a hexagonal cube-corner retroreflective element adjacent thereto are common. Although not shown, when the hexagonal cube-corner retroreflective elements 11 are arranged diagonally, for example, one outer circumferential side KL of one hexagonal cube-corner retroreflective element 11 and one outer circumferential side NI of a hexagonal cube-corner retroreflective element diagonally adjacent thereto are common.

Figure 2B:
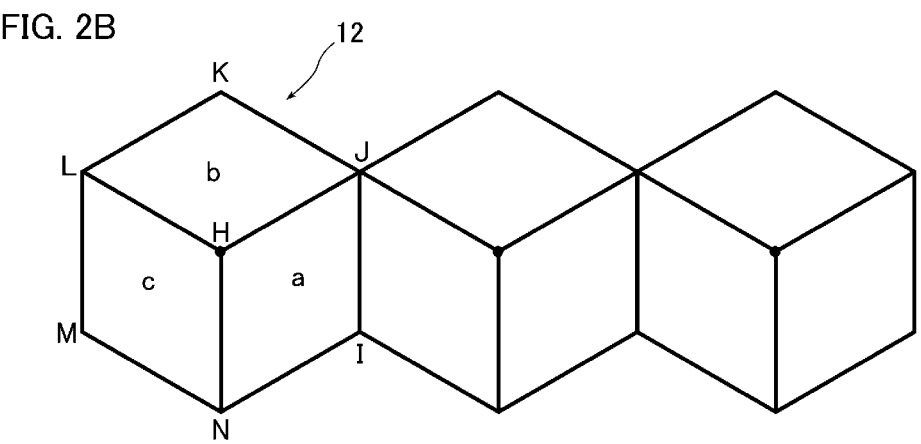

FIG. 2(B) shows three hexagonal cube-corner retroreflective elements 12 shown in FIG. 1(B) arranged in a row. Similarly, as shown in FIG. 2(B), when the hexagonal cube-corner retroreflective elements 12 are arranged, a side that two adjacent reflective lateral surfaces do not have in common is a common side of mutually adjacent hexagonal cube-corner retroreflective elements 12. In other words, as shown in FIG. 2(B), for example, one outer circumferential side IJ of one hexagonal cube-corner retroreflective element 12 and one outer circumferential side LM (not shown) of a hexagonal cube-corner retroreflective element adjacent thereto are common. Although not shown, when the hexagonal cube-corner retroreflective elements 12 are arranged diagonally, for example, one outer circumferential side NI of one hexagonal cube-corner retroreflective element 12 and one outer circumferential side KL of a hexagonal cube-corner retroreflective element diagonally adjacent thereto are common.

Figure 3A:
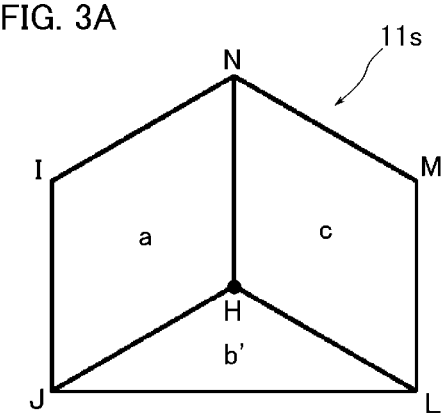
FIG. 3 shows views of cube-corner retroreflective elements obtained by cutting one reflective lateral surface of each of the hexagonal cube-corner retroreflective elements shown in FIG. 1.
Figure 3B:
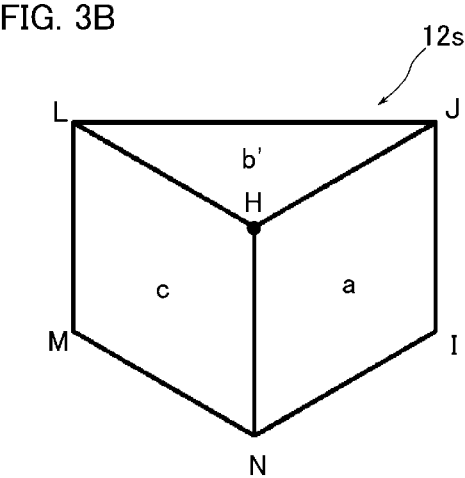

FIG. 3 shows views of cube-corner retroreflective elements obtained by cutting one reflective lateral surface of each of the hexagonal cube-corner retroreflective elements in FIG. 1. FIG. 3(A) is a view illustrating an example of the cube-corner retroreflective element obtained by cutting one reflective lateral surface of the hexagonal cube-corner retroreflective element 11 of FIG. 1(A), and FIG. 3(B) is a view illustrating an example of the cube-corner retroreflective element obtained by cutting one reflective lateral surface of the hexagonal cube-corner retroreflective element 12 of FIG. 1(B).

As illustrated in FIG. 3(A), a cube-corner retroreflective element 11s is a cube-corner retroreflective element having a pentagonal shape in which one reflective lateral surface of the hexagonal cube-corner retroreflective element 11 of FIG. 1(A) is cut into a triangle along a line connecting common apexes of only two adjacent reflective lateral surfaces, the apexes being opposed to each other. specifically, in FIG. 3(A), the reflective lateral surface b of the hexagonal cube-corner retroreflective element 11 shown in FIG. 1(A) is cut along a line JL connecting a common apex J of only two reflective lateral surfaces b and a and a common apex L of only two reflective lateral surfaces b and a into a reflective lateral surface b' formed by a triangle HJL. Alternatively, although not shown, the cube-corner retroreflective element 11s may be obtained by cutting another reflective lateral surface a along a line NJ connecting apexes N and J into a reflective lateral surface a' formed by a triangle HNJ or by cutting another reflective lateral surface c along a line LN connecting apexes L and N into a reflective lateral surface c' formed by a triangle HLN depending on the use thereof. Since the hexagonal cube-corner retroreflective element 11 is an element having a regular hexagonal shape as described above, the cube-corner retroreflective element 11s in which the reflective lateral surface a is cut along the line NJ connecting the apexes N and J of the cube-corner retroreflective element 11s in which the reflective lateral surface c is cut along the line LN connecting the apexes L and N can be obtained by rotating the cube-corner retroreflective element 11s in which the reflective lateral surface b is cut along the line JL connecting the apexes J and L about an axis perpendicular to the sheeting by 120 degrees or 240 degrees.

In addition, since the hexagonal cube-corner retroreflective element 12 has a shape obtained by rotating the hexagonal cube-corner retroreflective element 11 shown in FIG. 1(A) by 180 degrees around the axis perpendicular to the sheeting as described above, a cube-corner retroreflective element 12s having a pentagonal shape shown in FIG. 3(B) has a shape obtained by rotating the cube-corner retroreflective element 11s shown in FIG. 3(A) by 180 degrees around the axis perpendicular to the sheeting. Alternatively, although not shown, the cube-corner retroreflective element 12s may also be obtained by cutting another reflective lateral surface a along a line NJ connecting the apexes N and J into a triangular reflective lateral surface a' or by cutting another reflective lateral surface c along the line LN connecting the apexes L and N into a triangular reflective lateral surface c' depending on the use thereof. Similarly for the cube-corner retroreflective element 12, the cube-corner retroreflective element 12s in which the reflective lateral surface a is cut along the line NJ connecting the apexes N and J or the cube-corner retroreflective element 12s in which the reflective lateral surface c is cut along the line LN connecting the apexes L and N can be obtained by turning the cube-corner retroreflective element 12s in which the reflective lateral surface b is cut along the line JL connecting the common apexes J and L of only two reflective lateral surfaces, the apexes J and L being opposed to each other, around an axis perpendicular to the sheeting by 120 degrees or 240 degrees.

Figure 4A:
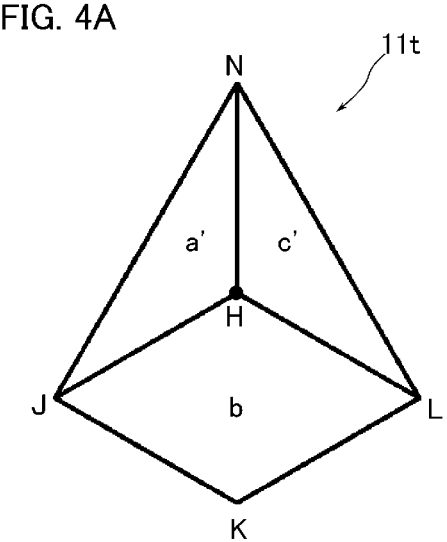
FIG. 4 shows views of cube-corner retroreflective elements obtained by cutting two reflective lateral surfaces of each of the hexagonal cube-corner retroreflective elements shown in FIG. 1.
Figure 4B:
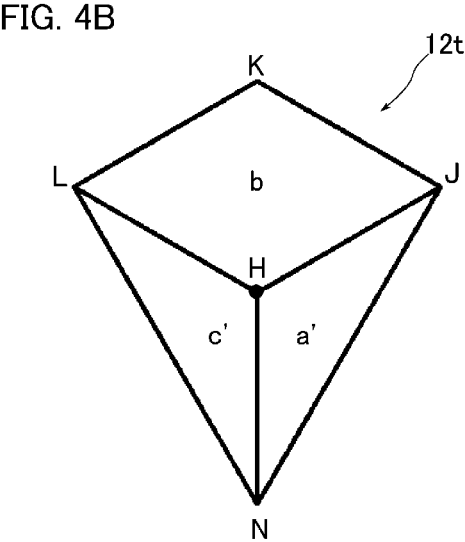

FIG. 4 shows views of cube-corner retroreflective elements obtained by cutting two reflective lateral surfaces of each of the hexagonal cube-corner retroreflective elements shown in FIG. 1. FIG. 4(A) is a view illustrating an example of the cube-corner retroreflective element obtained by cutting two reflective lateral surfaces of the hexagonal cube-corner retroreflective element 11 of FIG. 1(A), and FIG. 4(B) is a view illustrating an example of the cube-corner retroreflective element obtained by cutting two reflective lateral surfaces of the hexagonal cube-corner retroreflective element 12 of FIG. 1(B).

As illustrated in FIG. 4(A), a cube-corner retroreflective element 11t is a cube-corner retroreflective element 11t having a quadrangular shape in which two reflective lateral surfaces of the hexagonal cube-corner retroreflective element 11 of FIG. 1(A) are each cut into a triangle along a line connecting common apexes of only two adjacent reflective lateral surfaces, the apexes being opposed to each other. Specifically, in FIG. 4(A), the reflective lateral surface a of the hexagonal cube-corner retroreflective element 11 shown in FIG. 1(A) is cut into a triangular reflective lateral surface a' along a line NJ connecting the apex N and the common apex J of only two reflective lateral surfaces a and c, and the reflective lateral surface c is further cut into a triangular reflective lateral surface c' along a line connecting the common apex L of only two reflective lateral surfaces c and b and the common apex N of only two reflective lateral surfaces c and a. Although not shown, the cube-corner retroreflective element 11t may be obtained by cutting other reflective lateral surfaces a and b along the line NJ connecting the apexes N and J and the line JL connecting the apexes J and L into triangular reflective lateral surfaces a' and b', respectively, or but cutting other reflective lateral surfaces b and c along the line JL connecting the apexes J and L and the line LN connecting the apexes L and N into triangular reflective lateral surfaces b' and c', respectively. Since the hexagonal cube-corner retroreflective element 11 is an element having a regular hexagonal shape as described above, the cube-corner retroreflective element 11s in which the reflective lateral surfaces a and b are cut along the line NJ connecting the apexes N and J and the line JL connecting the apexes J and L, respectively, or the cube-corner retroreflective element 11s in which the reflective lateral surfaces b and c are cut along the line JL connecting the apexes J and L the line LN connecting the apexes L and N, respectively, can be obtained by turning the cube-corner retroreflective element 11t in which the reflective lateral surfaces a and c are cut along the line connecting the apexes N and J and the line connecting the apexes L and N, respectively, shown in FIG. 4(A) about an axis perpendicular to the sheeting by 120 degrees or 240 degrees.

In addition, since the hexagonal cube-corner retroreflective element 12 has a shape obtained by rotating the hexagonal cube-corner retroreflective element 11 shown in FIG. 1(A) by 180 degrees around the axis perpendicular to the sheeting as described above, a cube-corner retroreflective element 12t having a quadrangular shape shown in FIG. 4(B) has a shape obtained by rotating the cube-corner retroreflective element 11t shown in FIG. 4(A) by 180 degrees around the axis perpendicular to the sheeting. Alternatively, the cube-corner retroreflective element 12t may also be obtained by cutting other reflective lateral surfaces a and b along the line NJ connecting the apexes N and J and the line JL connecting the apexes J and L into triangular reflective lateral surfaces a' and b', respectively, or by cutting other reflective lateral surfaces b and c along the JL connecting the apexes J and L the line LN connecting the apexes L and N into triangular reflective lateral surface b' and c', respectively, depending on the use thereof. Similarly for the cube-corner retroreflective element 12, the cube-corner retroreflective element 12s in which the reflective lateral surfaces a and b are cut along the line NL connecting the apexes N and J and the line JL connecting the apexes J and L, respectively, or the cube-corner retroreflective element 12s in which the reflective lateral surfaces b and c are cut along the line JL connecting the apexes J and L and the line LN connecting the apexes L and N, respectively, can be obtained by turning the cube-corner retroreflective element 12s in which the reflective lateral surfaces a and c are cut along the line NJ connecting the apexes N and J and the line LN connecting the apexes L and N about the axis perpendicular to the sheeting by 120 degrees or 240 degrees.

FIG. 5 shows plan views of regions in the cube-corner retroreflective sheeting in which the cube-corner retroreflective elements shown in FIGS. 1, 3 and 4 are arranged in a closest-packed state.

Figure 5A:
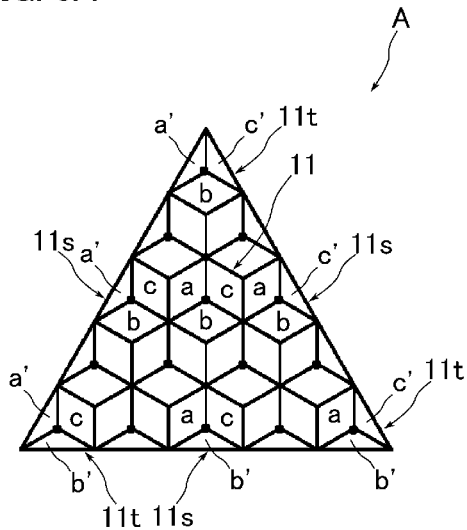
FIG. 5 shows plan views of regions in the cube-corner retroreflective sheeting according to the first embodiment in which the cube-corner retroreflective elements are arranged in a closest-packed state.

A region A shown in FIG. 5(A) has a regular triangular shape, in which cube-corner retroreflective elements that are not in contact with the outer circumference of the region A are the hexagonal cube-corner retroreflective elements 11 as shown in FIG. 1(A) and the hexagonal cube-corner retroreflective elements 11 are arranged in rows and diagonally as described with reference to FIG. 2(A) in a closest-packed state. Cube-corner retroreflective elements in contact with the outer circumference other than the respective apexes of the region A are the cube-corner retroreflective elements 11s having a pentagonal shape as described with reference to FIG. 3(A), and the triangular reflective lateral surfaces a', b' or c' thereof obtained by cutting along a line connecting common apexes of only two reflective lateral surfaces, the apexes being opposed to each other, are in contact with the outer circumference. The cube-corner retroreflective elements 11s having the pentagonal shape are arranged in contact with the hexagonal cube-corner retroreflective elements 11 with no gap therebetween. Cube-corner retroreflective elements in contact with the outer circumference at the respective apexes of the region A are the cube-corner retroreflective elements 11t having a quadrangular shape as described with reference to FIG. 4(A), and the two triangular reflective lateral surfaces a' and b', b' and c', or c' and a' thereof obtained by cutting along lines connecting common apexes of only two reflective lateral surfaces, the apexes being opposed to each other, are in contact with the outer circumference. The cube-corner retroreflective elements 11t having the quadrangular shape are arranged in contact with the hexagonal cube-corner retroreflective elements 11 and the cube-corner retroreflective elements 11s having the pentagonal shape with no gap therebetween. In this manner, the cube-corner retroreflective elements are arranged in a closest-packed state in the region A.

Figure 5B:
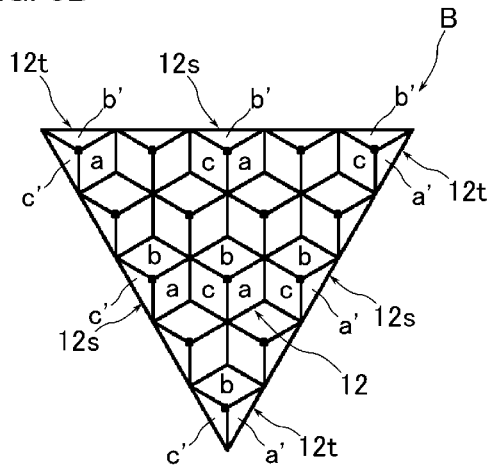

A region B shown in FIG. 5(B) has a regular triangular shape obtained by rotating the region A on a plane by 180 degrees. Cube-corner retroreflective elements that are not in contact with the outer circumference of the region B are the hexagonal cube-corner retroreflective elements 12 as shown in FIG. 1(B), and the hexagonal cube-corner retroreflective elements 12 are arranged in rows and diagonally as described with reference to FIG. 2(B) in a closest-packed state. Cube-corner retroreflective elements in contact with the outer circumference other than the respective apexes of the region B are the cube-corner retroreflective elements 12s having a pentagonal shape as described with reference to FIG. 3(B), and the triangular reflective lateral surfaces a', b' or c' thereof obtained by cutting along a line connecting common apexes of only two reflective lateral surfaces, the apexes being opposed to each other, are in contact with the outer circumference. The cube-corner retroreflective elements 11s having the pentagonal shape are arranged in contact with the hexagonal cube corner retroreflective elements 11 with no gap therebetween. Cube-corner retroreflective elements in contact with the outer circumference of the region B at the respective apexes of the region B are the cube-corner retroflective elements 12t having a quadrangular shape as described with reference to FIG. 4(B), and the two triangular reflective lateral surfaces a' and b', b' and c', or c' and a' thereof obtained by cutting along lines connecting common apexes of only two reflective lateral surfaces, the apexes being opposed to each other, are in contact with the outer circumference. The cube-corner retroreflective elements 12t having the quadrangular shape are arranged in contact with the hexagonal cube-corner retroreflective elements 12 and the cube-corner retroreflective elements 12s having the pentagonal shape with no gap therebetween. In this manner, the cube-corner retroreflective elements are arranged in a closest-packed state in the region B.

Figure 6:
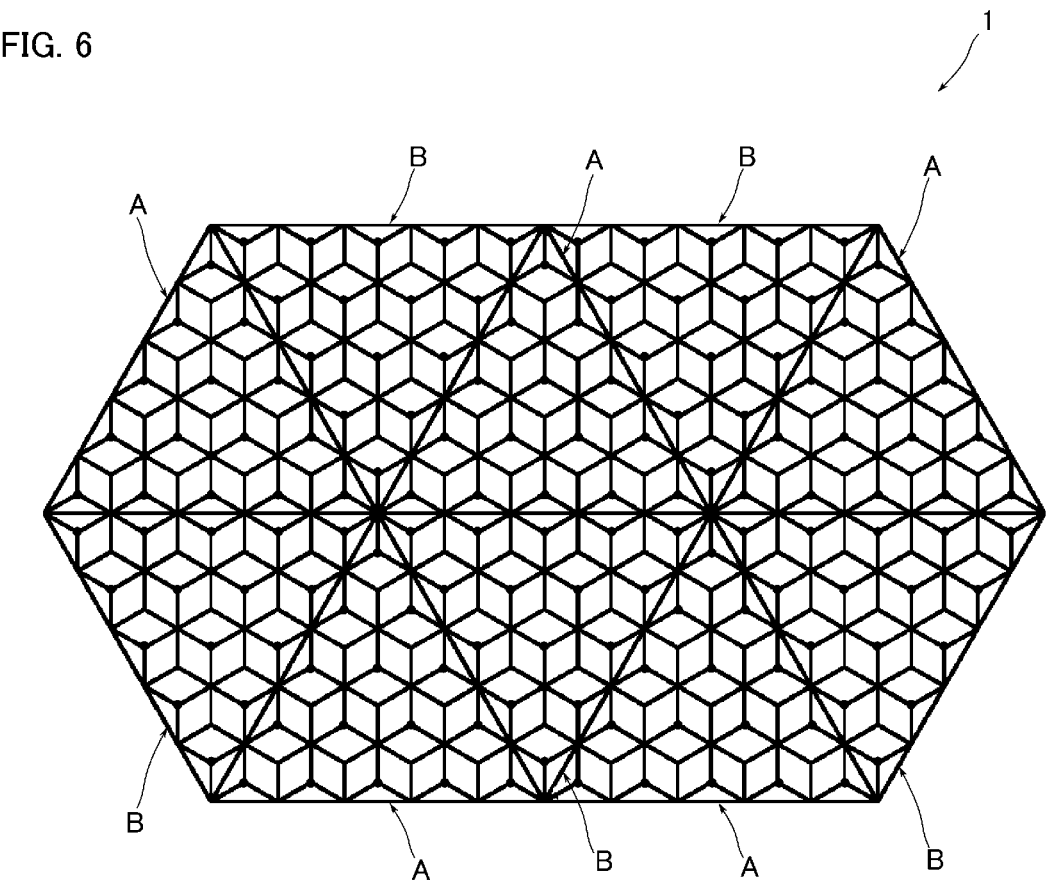
FIG. 6 is a plan view showing the cube-corner retroreflective sheeting according to the first embodiment of the present invention in which the regions of the cube-corner retroreflective sheeting shown in FIG. 5 are assembled.

FIG. 6 is a plan view showing the cube-corner retroreflective sheeting according to the present invention in which the regions of the cube-corner retroreflective sheeting shown in FIG. 5 are assembled. As shown in FIG. 6, the regions A and the regions B as shown in FIG. 5 are arranged adjacent to one another in cube-corner retroreflective sheeting 1. Accordingly, in the cube-corner retroreflective sheeting 1, cube-corner retroreflective elements that are in contact with parts of boundaries between the regions A and B (boundaries between the regions A and B where the apexes thereof are not in contact) are the cube-corner retroreflective elements 11s and 12s having the pentagonal shape, and the triangular reflective lateral surfaces a', b' and c' of the cube-corner retroreflective elements 11s and 12s are in contact with the boundaries between the regions A and B, while cube corner retroreflective elements that are in contact with the other parts of the respective boundaries between the regions A and B (boundaries in contact with the apexes of the regions A and B) are the cube-corner retroreflective elements 11t and 12t having the quadrangular shape, and the two triangular reflective lateral surfaces a' and b', b' and c', and c' and a' of the cube-corner retroreflective elements 11t and 12t are in contact with the boundaries between the regions A and B. Thus, the cube-corner retroreflective elements in contact with the respective regions A and B have retroreflectivity in the cube-corner retroreflective sheeting 1.

As described above, according to the cube-corner retroreflective sheeting 1 according to the present embodiment, the cube-corner retroreflective elements formed in the respective regions A and B are the hexagonal cube-corner retroreflective elements 11 and 12 having excellent reflection characteristics. In addition, since the cube-corner retroreflective elements in at least two regions A and B adjacent to each other have a relation in which the retroreflective elements rotate with each other, the regions have different rotation angle characteristics from each other. The rotation angle characteristics can therefore be improved in the cube-corner retroreflective sheeting 1 as a whole.

Moreover, each of the cube-corner retroreflective elements 11s and 12s or the cube-corner retroreflective elements 11t and 12t that are in contact with the boundaries between the respective regions A and B is obtained by cutting part of one or two reflective lateral surfaces of the hexagonal cube-corner retroreflective element 11 or 12, and the reflective lateral surfaces that are partly cut off are in contact with the boundaries between the regions A and B. Since such cube-corner retroreflective elements 11s, 12s 11t and 12t are arranged with the hexagonal cube-corner retroreflective elements 11 and 12 described above in a closest-packed state, the cube-corner retroreflective elements can be arranged in a closest-packed state at the boundaries with no gap therebetween. Furthermore, the cube-corner retroreflective elements 11s, 11s, 11t and 12t in contact with the boundaries each have three reflective lateral surfaces although parts of some reflective lateral surfaces are cut off. Therefore, even when light is incident around the boundaries between the respective regions, the light is reflected by the three reflective lateral surfaces of each of the cube-corner retroreflective elements 11s, 12s, 11t and 12t in contact with the boundaries and emitted as retroreflected light. Even when light is incident over a plurality of regions in this manner, it is possible to prevent the brightness around the boundaries from becoming lower and make the boundaries between the respective regions A and B less conspicuous since the cube-corner retroreflective elements 11s, 12s, 11t and 12t are in contact with the boundaries. As a result, according to the cube-corner retroreflective sheeting 1 of the present embodiment, excellent design can be achieved.

When the areas of the regions A and B having different rotation angle characteristics from each other are large in the cube-corner retroreflective sheeting 1, the regions can be distinguished by visual observation. In order that the respective regions A and B cannot be distinguished in this manner by visual observation and that the cube-corner retroreflective sheeting 1 has integrity as a whole, the areas of the regions A and B may be made smaller and the small regions may be arranged over the entire cube-corner retroreflective sheeting. In such a case, however, the number of boundaries between the regions A and B increases in the cube-corner retroreflective sheeting as a whole. According to the cube-corner retroreflective sheeting 1 of the present embodiment, however, it is possible to prevent the retroreflection characteristics of the cube-corner retroreflective sheeting 1 as a whole from lowering even when the regions A and B having small area are arranged over the entire cube-corner retroreflective sheeting 1 since the cube-corner retroreflective elements 11s, 12s, 11t and 12t do not lower retroreflectivity.

(Second Embodiment)

Next, a second embodiment of the present invention will be described in detail with reference to FIGS. 7 to 9. Here, components that are identical or similar to those in the first embodiment are designated by the same reference numerals and redundant description will not be repeated unless the description is particularly stated.

FIG. 7 shows views in which hexagonal cube-corner retroreflective elements of cube-corner retroreflective sheeting according to the second embodiment of the present invention are arranged, and corresponds to FIG. 2 in the first embodiment. FIG. 8 shows plan views of regions in the cube-corner retroreflective sheeting according to the present embodiment in which the cube-corner retroreflective elements are arranged in a closest-packed state, and FIG. 9 is a plan view showing the cube-corner retroreflective sheeting according to the present invention in which the regions of the cube-corner retroreflective sheeting shown in FIG. 8 are assembled.

As shown in FIG. 7, hexagonal cube-corner retroreflective elements 21 and 22 in the present embodiment are different from the hexagonal cube-corner retroreflective elements 11 and 12 in the first embodiment in that one edge line HN out of three edge lines HJ, HL and HN has a length different from that of the other edge lines HJ and HL. The cube-corner retroreflective elements 21 and 22 rotate relative to each other by 180 degrees around an axis perpendicular to the sheeting.

Figure 7A:
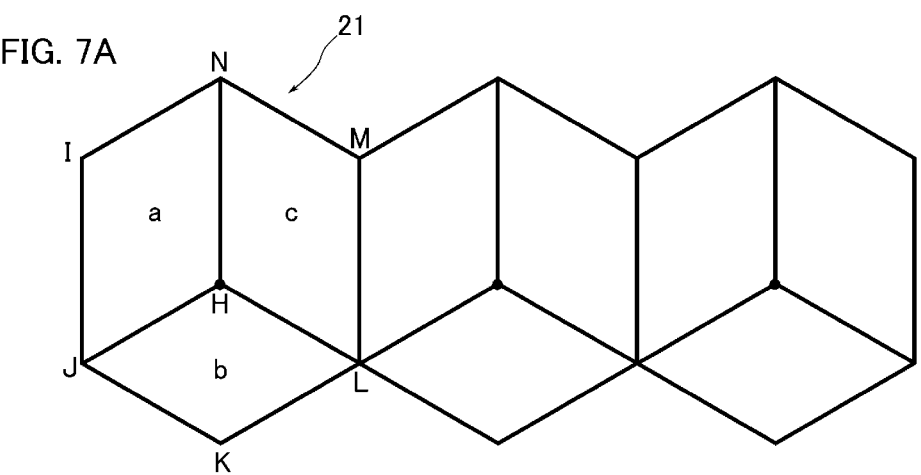
FIG. 7 shows views in which hexagonal cube-corner retroreflective elements of cube-corner retroreflective sheeting according to a second embodiment of the present invention are arranged.
Figure 8A:
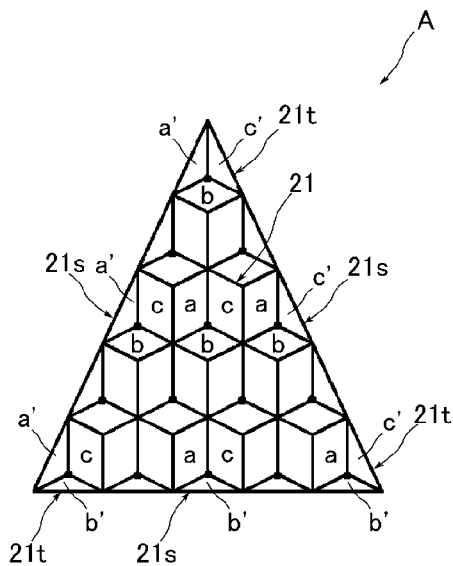
FIG. 8 shows plan views of regions in the cube-corner retroreflective sheeting according to the second embodiment in which the cube-corner retroreflective elements are arranged in a closest-packed state.

A region A shown in FIG. 8(A) has an isosceles triangular shape, and cube-corner retroreflective elements that are not in contact with the outer circumference of the region A are the hexagonal cube-corner retroreflective elements 21 shown in FIG. 7(A). Cube-corner retroreflective elements in contact with the outer circumference other than the respective apexes of the region A are cube-corner retroreflective elements 21s having a pentagonal shape each obtained by cutting one of three reflective lateral surfaces a, b and c of the hexagonal cube-corner retroreflective element 21 shown in FIG. 7(A) along a line connecting common apexes of only two adjacent reflective lateral surfaces, the apexes being opposed to each other, into a triangular reflective lateral surface b', b' or c'. Furthermore, cube-corner retroreflective elements in contact with the outer circumference at the respective apexes of the region A are cube-corner retroreflective elements 21t having a quadrangular shape each obtained by cutting two of the three reflective lateral surfaces a, b, and c of the hexagonal cube-corner retroreflective element 21 shown in FIG. 7(A) each along a line connecting common apexes of only two adjacent reflective lateral surfaces, the apexes being opposed to each other, into triangular reflective lateral surfaces b', b' or c'.

Figure 7B:
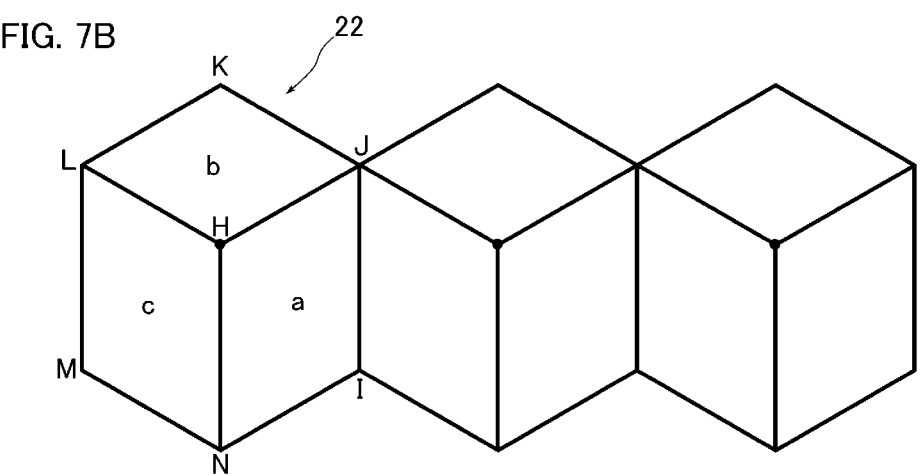
Figure 8B:
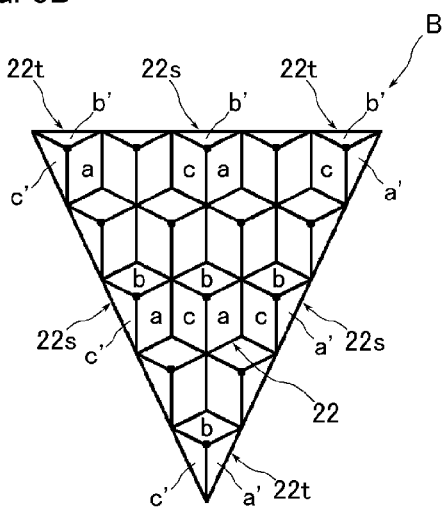

A region B shown in FIG. 8(B) has an isosceles triangular shape, and cube-corner retroreflective elements that are not in contact with the outer circumference of the region B are the hexagonal cube-corner retroreflective elements 22 shown in FIG. 7(B). Cube-corner retroreflective elements in contact with the outer circumference other than the respective apexes of the region B are cube-corner retroreflective elements 22s having a pentagonal shape each obtained by cutting one of three reflective lateral surfaces a, b, and c of the hexagonal cube-corner retroreflective element 22 shown in FIG. 7(B) along a line connecting common apexes of only two adjacent reflective lateral surfaces, the apexes being opposed to each other, into a triangular reflective lateral surface b', b', or c'. Furthermore, cube-corner retroreflective elements in contact with the outer circumference at the respective apexes of the region A are cube-corner retroreflective elements 22t having a quadrangular shape each obtained by cutting two of the three reflective lateral surfaces a, b, and c of the hexagonal cube-corner retroreflective element 22 shown in FIG. 7(B) each along a line connecting common apexes of only two adjacent reflective lateral surfaces, the apexes being opposed to each other, into triangular reflective lateral surfaces b', b' or c'.

Figure 9:
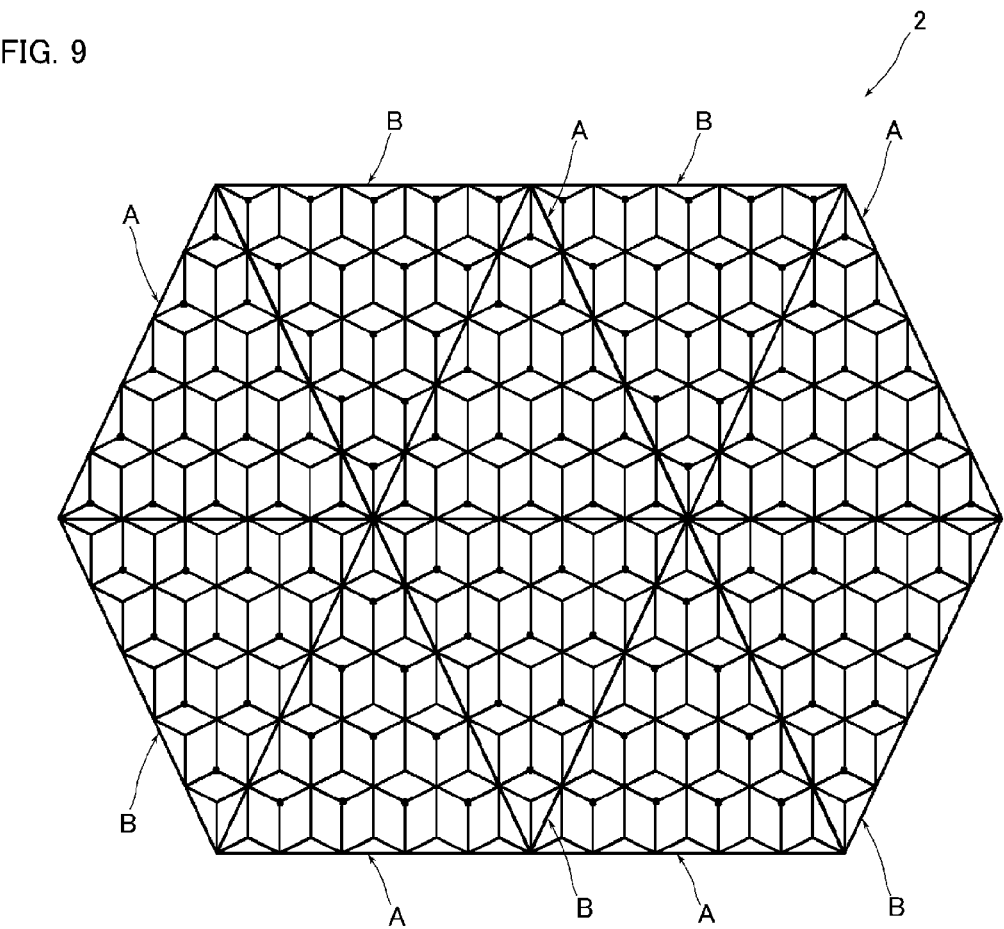
FIG. 9 is a plan view showing the cube-corner retroreflective sheeting according to the second embodiment of the present invention in which the regions of the cube-corner retroreflective sheeting shown in FIG. 8 are assembled.

In addition, as shown in FIG. 9, the regions A and the regions B as shown in FIG. 8 are arranged adjacent to one another in cube-corner retroreflective sheeting 2. Accordingly, in the cube-corner retroreflective sheeting 2, cube-corner retroreflective elements that are in contact with parts of boundaries between the regions A and B are the cube-corner retroreflective elements 21s and 22s having the pentagonal shape, and the triangular reflective lateral surfaces a', b', and c' of the cube-corner retroreflective elements 21s and 22s are in contact with the boundaries between the regions A and B. In addition, cube-corner retroreflective elements that are in contact with the other parts of the respective boundaries between the regions A and B are the cube-corner retroreflective elements 21t and 22t having the quadrangular shape, and the two triangular reflective lateral surfaces a' and b', b' and c', and c' and a' of the cube-corner retroreflective elements 21t and 22t are in contact with the boundaries between the regions A and B. Thus, the cube-corner retroreflective elements in contact with the respective regions A and B have retroreflectivity in the cube-corner retroreflective sheeting 2.

As a result of the modification in the shapes of the cube-corner retroreflective elements 21 and 22 to those of the cube-corner retroreflective elements 11 and 12 of the first embodiment as in the present embodiment, the shapes of the respective regions A and B can be modified from those of the regions A and B in the first embodiment even when the cube-corner retroreflective elements are arranged similarly in a closest-packed state.

(Third Embodiment)

Next, a third embodiment of the present embodiment will be described in detail with reference to FIGS. 10 and 11. Here, components that are identical or similar to those in the first embodiment are designated by the same reference numerals and redundant description will not be repeated unless the description is particularly stated.

Figure 10:
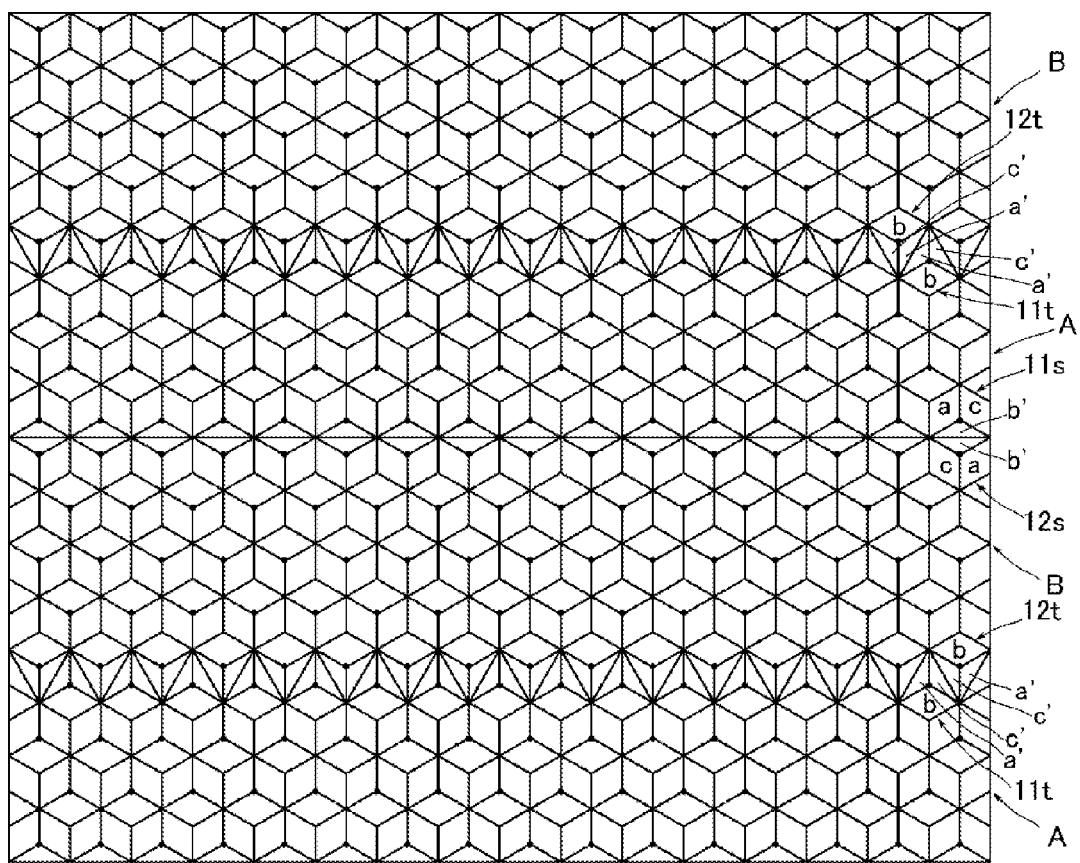
FIG. 10 is a plan view showing cube-corner retroreflective sheeting according to a third embodiment of the present invention.
Figure 11:
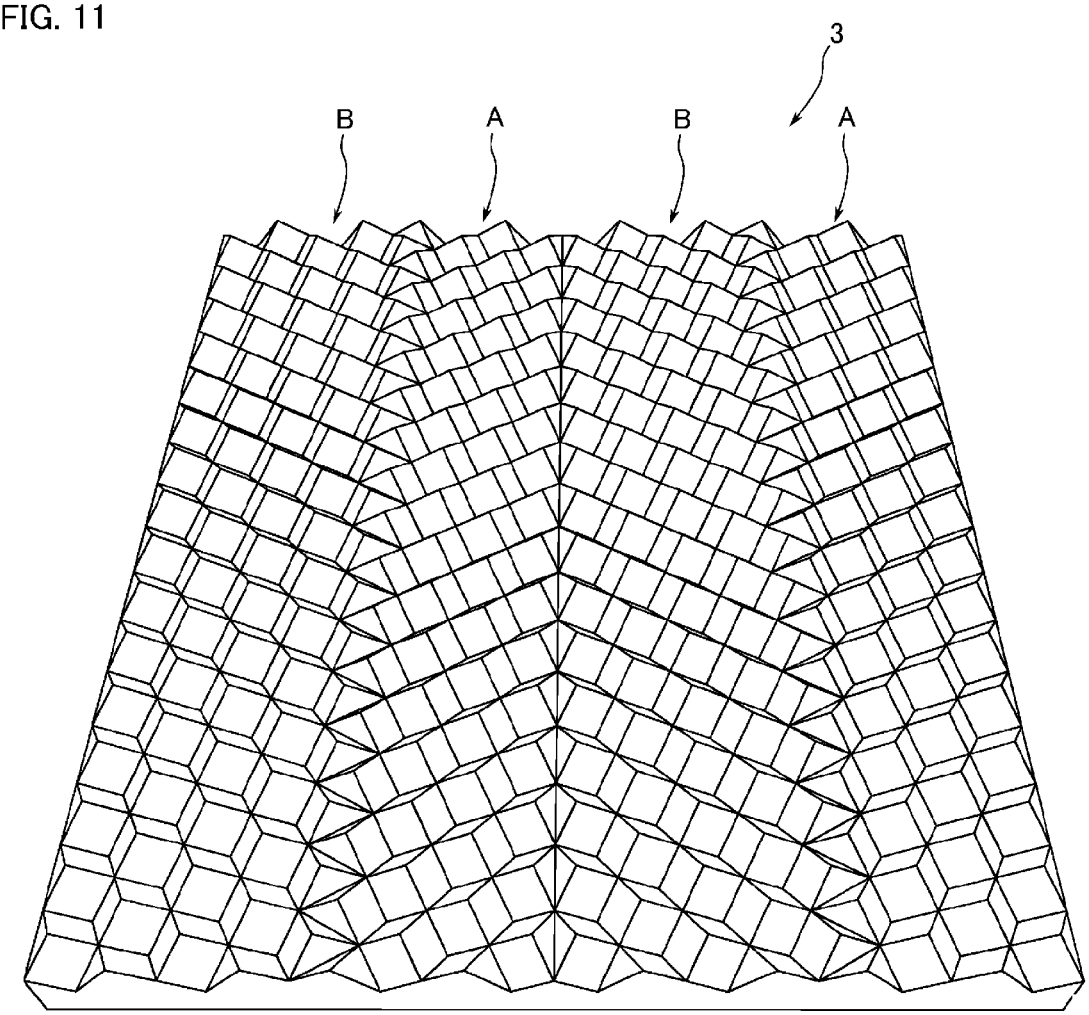
FIG. 11 is a perspective view of the cube-corner retroreflective sheeting shown in FIG. 10.

FIG. 10 is a plan view showing cube-corner retroreflective sheeting according to the third embodiment of the present invention, and FIG. 11 is a perspective view of the cube-corner retroreflective sheeting shown in FIG. 10.

As shown in FIGS. 10 and 11, in cube-corner retroreflective sheeting 3, two regions A and B having rotation angle characteristics different from each other by 180 degrees are formed in belt-like shapes and the regions A and B are arranged alternately. A first outer edge of the region A is straight and a second outer edge of the region B is straight and a first outer edge thereof is zigzag. Accordingly, the straight outer edge of the region A and the straight outer edge of the region B are in contact with each other to form a straight boundary, while the zigzag outer edge of the region A and the zigzag outer edge of the region B are in contact with each other to form a zigzag boundary.

In the region A, cube-corner retroreflective elements that are not in contact with the boundaries are the hexagonal cube-corner retroreflective elements 11 as shown in FIG. 1(A), and the hexagonal cube-corner retroreflective elements 11 are arranged in a closest-packed state. Cube-corner retroreflective elements in contact with the straight boundary of the region A are the cube-corner retroreflective elements 11s having a pentagonal shape as described with reference to FIG. 3(A), and the triangular reflective lateral surfaces b' thereof each obtained by cutting along a line connecting common apexes of only two reflective lateral surfaces, the apexes being opposed to each other, are in contact with the boundary. The cube-corner retroreflective elements 11s having the pentagonal shape are arranged in contact with the hexagonal cube-corner retroreflective elements 11 with no gap therebetween. Cube-corner retroreflective elements in contact with the zigzag boundary of the region A are the cube-corner retroreflective elements 11t having a quadrangular shape as described with reference to FIG. 4(A), and the two triangular reflective lateral surfaces a' and c' thereof each obtained by cutting along a line connecting common apexes of only two reflective lateral surfaces, the apexes being opposed to each other, are in contact with the boundary. The cube-corner retroreflective elements 11t having the quadrangular shape are arranged in contact with the hexagonal cube-corner retroreflective elements 11 with no gap therebetween. In this manner, the cube-corner retroreflective elements are arranged in a closest-packed state in the region A.

In the region B, on the other hand, cube-corner retroreflective elements that are not in contact with the boundaries are the hexagonal cube-corner retroreflective elements 12 as shown in FIG. 1(B), and the hexagonal cube-corner retroreflective elements 12 are arranged in a closest-packed state. Cube-corner retroreflective elements in contact with the straight boundary of the region B are the cube-corner retroreflective elements 12s having a pentagonal shape as described with reference to FIG. 3(B), and the triangular reflective lateral surfaces b' thereof each obtained by cutting along a line connecting common apexes of only two reflective lateral surfaces, the apexes being opposed to each other, are in contact with the boundary. The cube-corner retroreflective elements 12s having the pentagonal shape are arranged in contact with the hexagonal cube-corner retroreflective elements 12 with no gap therebetween. Cube-corner retroreflective elements in contact with the zigzag boundary of the region B are the cube-corner retroreflective elements 12t having a quadrangular shape as described with reference to FIG. 4(B), and the two triangular reflective lateral surfaces c' and a' thereof each obtained by cutting along a line connecting common apexes of only two reflective lateral surfaces, the apexes being opposed to each other, are in contact with the boundary. The cube-corner retroreflective elements 12t having the quadrangular shape are arranged in contact with the hexagonal cube-corner retroreflective elements 12 with no gap therebetween. In this manner, the cube-corner retroreflective elements are arranged in a closest-packed state in the region B.

As described above, the regions A and B are adjacent to one another straight boundaries and zigzag boundaries therebetween.

(Fourth Embodiment)

Next, a second embodiment of the present invention will be described in detail with reference to FIGS. 12 to 15. Here, components that are identical or similar to those in the first embodiment are designated by the same reference numerals and redundant description will not be repeated unless the description is particularly stated.

Figure 12A:
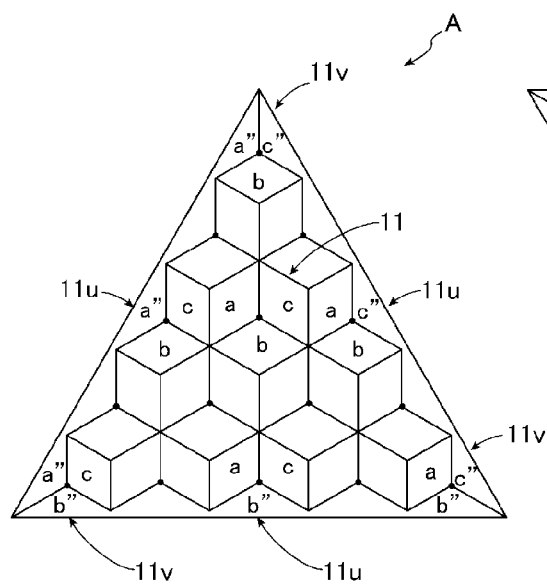
FIG. 12 shows plan views of regions in cube-corner retroreflective sheeting according to a fourth embodiment in which cube-corner retroreflective elements are arranged in a closest-packed state.
Figure 12B:
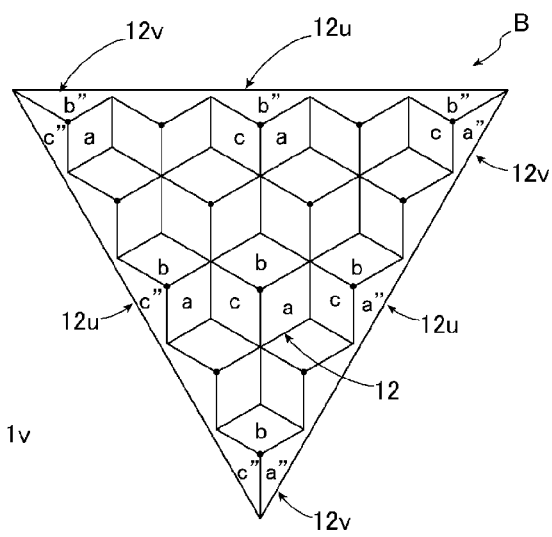

FIG. 12 shows plan views of regions in cube-corner retroreflective sheeting according to the present embodiment in which cube-corner retroreflective elements are arranged in a closest-packed state. Specifically, FIG. 12(A) is a plan view showing one region of the cube-corner retroreflective sheeting, and FIG. 12(B) is a plan view showing another region of the cube-corner retroreflective sheeting. As shown in FIG. 12, in a region A that is the aforementioned one region, hexagonal cube-corner retroreflective elements 11 that are not in contact with the outer circumference are the same as the hexagonal cube-corner retroreflective elements 11 that are not in contact with the outer circumference of the region A in the first embodiment. Similarly, in a region B that is the aforementioned another region, hexagonal cube-corner retroreflective elements 12 that are not in contact with the outer circumference are the same as the hexagonal cube-corner retroreflective elements 21 that are not in contact with the outer circumference of the region B in the first embodiment.

Figure 13A:
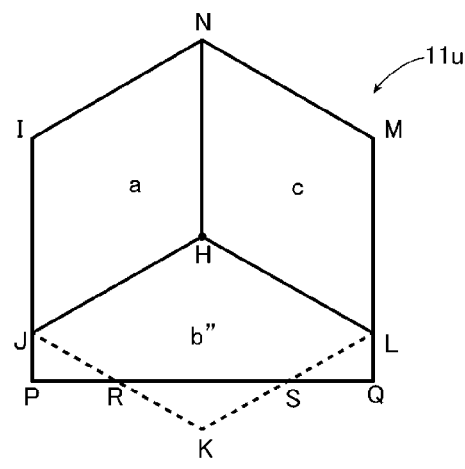
FIG. 13 shows views of cube-corner retroreflective elements in contact with parts of outer circumferences of the regions shown in FIG. 12.
Figure 13B:
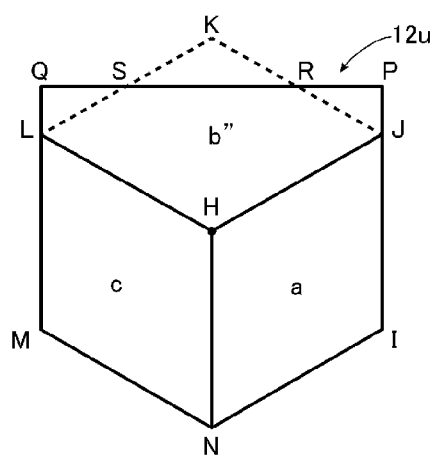

FIG. 13 shows views of cube-corner retroreflective elements in contact with parts of the outer circumferences of the regions shown in FIG. 12, in which FIG. 13(A) shows one cube-corner retroreflective element 11u in contact with a part of the outer circumference of the region A and FIG. 13(B) shows one cube-corner retroreflective element 12u in contact with a part of the outer circumference of the region B.

The cube-corner retroreflective element 11u shown in FIG. 13(A) is in contact with the outer circumference of the region A at one reflective lateral surface b". The reflective lateral surface b" in contact with the outer circumference contains a pentagon HJRSL obtained by cutting a reflective lateral surface b of the hexagonal cube-corner retroreflective element 11 that is not in contact with the outer circumference along a line RS connecting points R and S on two sides JK and KL, respectively, that are not edge lines HJ and HL. As a result, the reflective lateral surface b" is a pentagonal surface HJPQL. In the cube-corner retroreflective element 11s of the first embodiment, a surface b' in contact with the outer circumference of the region A is the triangle HJL, for example. In contrast, in the cube-corner retroreflective element 11u of the present embodiment, since the reflective lateral surface b" in contact with the outer circumference of the region A contains the pentagon HJRSL having an area larger than that of the triangle HJL, the reflective lateral surface b" has an area larger than that of the reflective lateral surface b' in contact with the outer circumference in the first embodiment.

Alternatively, although not shown, the reflective lateral surface of the cube-corner retroreflective element 11u that is in contact with the outer circumference may be a surface a" containing a pentagon obtained by cutting another reflective lateral surface a along a line connecting respective points on two sides NI and IJ that are the not edge lined HJ and HN or may be a surface c" containing a pentagon obtained by cutting another reflective lateral surface c along a line connecting respective points on two sides LM and MN that are not the edge lines HL and HN depending on the use thereof. These reflective lateral surfaces a" and c" have larger area than the reflective lateral surfaces a' and c' in the first embodiment.

Since the hexagonal cube-corner retroreflective element 11 is an element having a regular hexagonal shape as described above, the cube-corner retroreflective element 11$u$ containing the reflective lateral surface a" or the cube-corner retroreflective element 11$u$ containing the reflective lateral surface c" can be obtained by turning the cube-corner retroreflective element 11$u$ containing the reflective lateral surface b" about an axis perpendicular to the sheeting by 120 degrees or 240 degrees.

In addition, since the hexagonal cube-corner retroreflective element 12 has a shape obtained by rotating the hexagonal cube-corner retroreflective element 11 shown in FIG. 1(A) by 180 degrees around the axis perpendicular to the sheeting as described above, a cube-corner retroreflective element 12$u$ shown in FIG. 13(B) has a shape obtained by rotating the cube-corner retroreflective element 11$u$ shown in FIG. 13(A) by 180 degrees around the axis perpendicular to the sheeting. alternatively, although not shown, the reflective lateral surface that is in contact with the outer circumference of the cube-corner retroreflective element 12$u$ may be a surface a" containing a pentagon obtained by cutting another reflective lateral surface a along a line connecting respective points on two sides NI and IJ that are the not edge lines HJ and HN or may be a surface c" containing a pentagon obtained by cutting another reflective lateral surface c along a line connecting respective points on two sides LM and MN that are not the edge lines HL and HN depending on the use thereof. Since the hexagonal cube-corner retroreflective element 12 is an element having a regular hexagonal shape as described above, the cube-corner retroreflective element 12$u$ containing the reflective lateral surface a" or the cube-corner retroreflective element 12$u$ containing the reflective lateral surface c" can be obtained by turning the cube-corner retroreflective element 12$u$ containing the reflective lateral surface b" about an axis perpendicular to the sheeting by 120 degrees of 240 degrees.

Figure 14A:
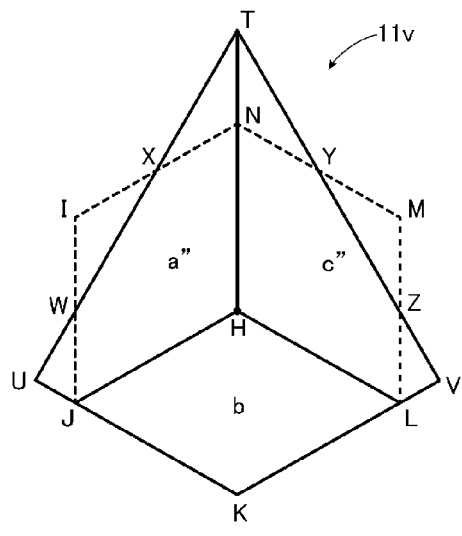
FIG. 14 shows views of cube-corner retroreflective elements in contact with other parts of the outer circumferences of the regions shown in FIG. 12.
Figure 14B:
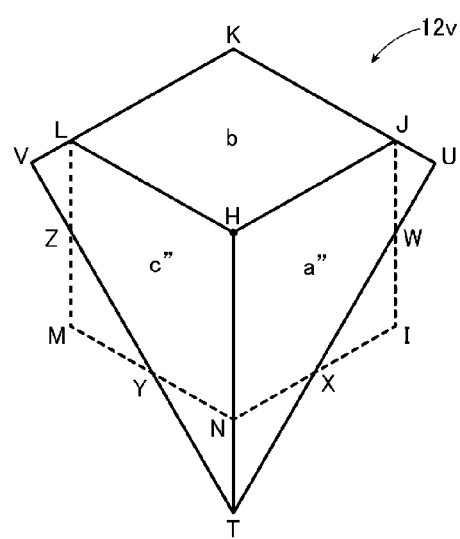

FIG. 14 shows views of cube-corner retroreflective elements in contact with other parts of the outer circumferences of the regions shown in FIG. 12, in which FIG. 14(A) shows one cube-corner retroreflective element 11$v$ in contact with another part of the outer circumference of the region A and FIG. 14(B) shows one cube-corner retroreflective element 12$v$ in contact with another part of the outer circumference of the region B.

As is apparent from FIG. 12(A) and FIG. 14(A), two reflective lateral surfaces a" and c" of the cube-corner retroreflective element 11$v$ are in contact with the outer circumference of the region A. In the cube-corner retroreflective element 11$v$, the reflective lateral surface a" in contact with the outer circumference is a quadrangular surface HTUJ containing a pentagon HNXWJ obtained by cutting the reflective lateral surface a of the hexagonal cube-corner retroreflective element 11 that is not in contact with the outer circumference along a line XW connecting points X and W on two sides NI and IJ, respectively, that are not the edge lines HN and HJ. In addition, the reflective lateral surface c" in contact with the outer circumference is a quadrangular surface HLVT containing a pentagon HLZYN obtained by cutting the reflective lateral surface c of the hexagonal cube-corner retroreflective element 11 that is not in contact with the outer circumference along a line ZY connecting points Z and Y on two sides LM and MN, respectively, that are not the edge line HL and HN. In the hexagonal cube-corner retroreflective element 11$v$, since the reflective lateral surface a" in contact with the outer circumference of the region A contains the pentagon HNXWJ having a larger area than the triangle HNJ that is the reflective lateral surface a' in the first embodiment, the reflective lateral surface a" also has a larger area than the reflective lateral surface a' in the first embodiment, and since the reflective lateral surface c" contains the pentagon HLZYN having a larger area than the triangle HLN that is the reflective lateral surface c' in the first embodiment, the reflective lateral surface c" also has a larger area than the reflective lateral surface c' in the first embodiment.

Alternatively, although not shown, the reflective lateral surfaces of the cube-corner retroreflective element 11$v$ that are in contact with the outer circumference may be a surface b" containing a pentagon obtained by cutting another reflective lateral surface b along a line connecting respective points on two sides JK and KL that are the not edge lined HJ and HL and a surface c" containing a pentagon obtained by cutting another reflective lateral surface c along a line connecting respective points on two sides LM and MN that are not the edge lines HL and HN depending on the use thereof. Still alternatively, the reflective lateral surfaces may be a surface c" containing a pentagon obtained by cutting another reflective lateral surface c along a line connecting respective points on two sides LM and MN that are the not edge lines HL and HN and a surface b" containing a pentagon obtained by cutting another reflective lateral surface b along a line connecting respective points on two sides JK and KL that are not the edge lines HJ and HL depending on the use thereof. Similarly, in these cases, the reflective lateral surfaces a", b", and c" have larger area than the reflective lateral surfaces a', b', and c' in the first embodiment.

Since the hexagonal cube-corner retroreflective element 11 is an element having a regular hexagonal shape as described above, the cube-corner retroreflective element 11$v$ containing the reflective lateral surfaces a" and b" or the cube-corner retroreflective element 11$v$ containing the reflective lateral surfaces b" and c" can be obtained by turning the cube-corner retroreflective element 11$v$ containing the reflective lateral surfaces a" and c" about an axis perpendicular to the sheeting by 120 degrees or 240 degrees.

In addition, since the hexagonal cube-corner retroreflective element 12 has a shape obtained by rotating the hexagonal cube-corner retroreflective element 11 shown in FIG. 1(A) by 180 degrees around the axis perpendicular to the sheeting as described above, the cube-corner retroreflective element 12$v$ shown in FIG. 14(B) has a shape obtained by rotating the cube-corner retroreflective element 11$v$ shown in FIG. 14(A) by 180 degrees around the axis perpendicular to the sheeting. Alternatively, although not shown, the reflective lateral surfaces that are in contact with the outer circumference of the cube-corner retroreflective element 12$v$ may be a surface b" containing a pentagon obtained by cutting another reflective lateral surface b along a line connecting respective points on two sides JK and KL that are the not edge lined HJ and HL and a surface c" containing a pentagon obtained by cutting another reflective lateral surface c along a line connecting respective points on two sides LM and MN that are not the edge lines HL and HN depending on the use thereof. Still alternatively, the reflective lateral surfaces may be a surface c" containing a pentagon obtained by cutting another reflective lateral surface c along a line connecting respective points on two sides LM and MN that are the not edge lines HL and HN and a surface b" containing a pentagon obtained by cutting another reflective lateral surface b along a line connecting respective points on two sides JK and KL that are not the edge lines HJ and HL depending on the use thereof. Since the hexagonal cube-corner retroreflective element 12 is an element having a regular hexagonal shape as described above, the cube-corner retroreflective element 12v containing the reflective lateral surfaces a" and b" or the cube-corner retroreflective element 12v containing the reflective lateral surfaces b" and c" can be obtained by turning the cube-corner retroreflective element 12v containing the reflective lateral surfaces a" and c" about an axis perpendicular to the sheeting by 120 degrees or 240 degrees.

As a result of arranging these cube-corner retroreflective elements 11, 11u, and 11v in a closest-packed state, the region A having a regular triangular shape shown in FIG. 12(A) is obtained. Specifically, the cube-corner retroreflective elements in contact with the outer circumference of the region A other than the respective apexes thereof are the cube-corner retroreflective elements 11u, which are arranged with no gap therebetween and with the reflective lateral surfaces a", b" or c" in contact with the outer circumference. In addition, the cube-corner retroreflective elements in contact with the outer circumference of the region A at the respective apexes thereof are the cube-corner retroreflective elements 11v with the reflective lateral surfaces a" and b", b" and c", or c" and a" in contact with the outer circumference. The cube-corner retroreflective elements 11v are arranged in contact with the hexagonal cube-corner retroreflective elements 11 and the cube-corner retroreflective elements 11u with no gap therebetween. In this manner, the cube-corner retroreflective elements 11, 11u, and 11v are arranged in a closest-packed state in the region A.

Similarly, as a result of arranging the cube-corner retroreflective elements 12, 12u, and 12v described above in a closest-packed state, the region B having a regular triangular shape shown in FIG. 12(B) is obtained. Specifically, the cube-corner retroreflective elements in contact with the outer circumference of the region B other than the respective apexes thereof are the cube-corner retroreflective elements 12u, which are arranged with no gap therebetween and with the reflective lateral surfaces a", b" or c" in contact with the outer circumference. In addition, the cube-corner retroreflective elements in contact with the outer circumference of the region B at the respective apexes thereof are the cube-corner retroreflective elements 12v with the reflective lateral surfaces a" and b", b" and c", or c" and a" in contact with the outer circumference. The cube-corner retroreflective elements 12v are arranged in contact with the hexagonal cube-corner retroreflective elements 12 and the cube-corner retroreflective elements 12u with no gap therebetween. In this manner, the cube-corner retroreflective elements 12, 12u, and 12v are arranged in a closest-packed state in the region B.

Figure 15:
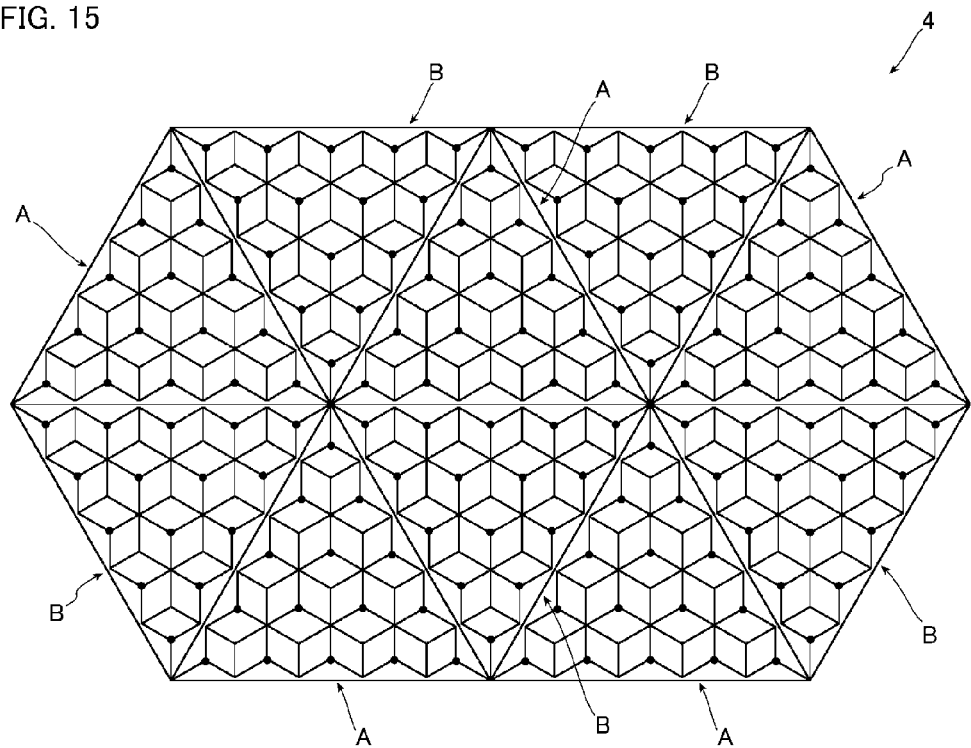
FIG. 15 is a plan view showing the cube-corner retroreflective sheeting according to the fourth embodiment of the present invention in which the regions of the cube-corner retroreflective sheeting shown in FIG. 12 are assembled.

FIG. 15 is a plan view showing the cube-corner retroreflective sheeting according to the present invention in which the regions A of the cube-corner retroreflective sheeting shown FIG. 12(A) and the regions B of the cube-corner retroreflective sheeting shown in FIG. 12(B) are assembled.

As shown in FIG. 15, the regions A and the regions B are arranged adjacent to one another in cube-corner retroreflective sheeting 4. Accordingly, in the cube-corner retroreflective sheeting 4, cube-corner retroreflective elements that are in contact with parts of boundaries between the regions A and B (boundaries between the regions A and B where the apexes thereof are not in contact) are the cube-corner retroreflective elements 11u and 12u having the pentagonal shape, and the reflective lateral surfaces a", b", and c" of the cube-corner retroreflective elements 11u and 12u are in contact with the boundaries between the regions A and B. In addition, cube-corner retroreflective elements that are in contact with the other parts of the respective boundaries between the regions A and B (boundaries in contact with the apexes of the regions A and B) are the cube-corner retroreflective elements 11v and 12v having the quadrangular shape, and, at boundaries including apexes of the regions A and B, the two triangular reflective lateral surfaces a" and b", b" and c", or c" and c" of the cube-corner retroreflective elements 11v and 12v are in contact with the boundaries between the regions A and B. Thus, the cube-corner retroreflective elements in contact with the respective regions A and B have retroreflectivity in the cube-corner retroreflective sheeting 4. Since the reflective lateral surfaces a", b", and c" have larger areas than the reflective lateral surfaces a', b', and c' in the first embodiment as described above, the reflective lateral surfaces in contact with the boundaries between the regions A and B in the present embodiment have larger area than the reflective lateral surfaces in contact with the boundaries between the regions A and B in the first embodiment.

As described above, in the cube-corner retroreflective sheeting 4 according to the present embodiment, the areas of the reflective lateral surfaces in contact with the boundaries between the regions A and B can be made larger, a decrease in reflective efficiency around the boundaries can be made smaller, and a decrease in brightness around the boundaries can be made smaller. As a result, the boundaries can be made less conspicuous and cube-corner retroreflective sheeting excellent in design can be achieved.

(Fifth Embodiment)

Next, a fifth embodiment of the invention will be described in detail with reference to FIG. 16. Here, components that are identical or similar to those in the third embodiment are designated by the same reference numerals and redundant description will not be repeated unless the description is particularly stated.

Figure 16:
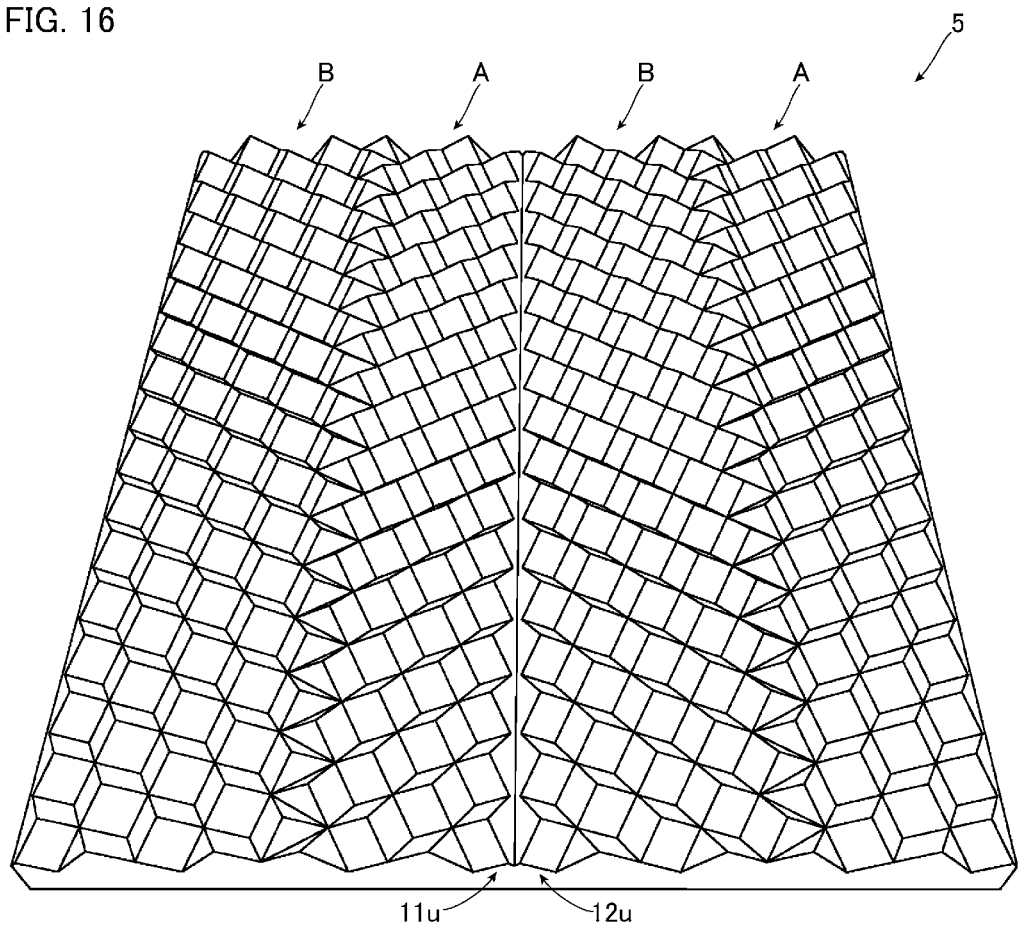
FIG. 16 is a perspective view of cube-corner retroreflective sheeting according to a fifth embodiment of the present invention.

FIG. 16 is a perspective view of cube-corner retroreflective sheeting according to the fifth embodiment of the present invention. As shown in FIG. 16, cube-corner retroreflective sheeting 5 of the present embodiment is different from the cube-corner retroreflective sheeting 3 of the third embodiment in that the retroreflective surfaces in contact with straight boundaries in the regions A and B are the retroreflective surfaces 11u and 12u, respectively, shown in the fourth embodiment. The reflective lateral surfaces in contact with the straight boundaries in the present embodiment therefore have larger area than the reflective lateral surfaces in contact with the straight boundaries in the third embodiment.

According to the cube-corner retroreflective sheeting 5 of the present embodiment, a decrease in brightness around the straight boundaries between the regions A and B can be made smaller and the boundaries can be made less conspicuous.

While the cube-corner retroreflective elements in contact with the straight boundaries in the present embodiment are the cube-corner retroreflective elements 11u of the fourth embodiment, the cube-corner retroreflective elements in contact with zigzag boundaries between the regions A and B may be the cube-corner retroreflective elements 11v of the fourth embodiment. Since the brightness around the zigzag boundaries in this case is not lowered than that around the zigzag boundaries between the regions A and B in the cube-corner retroreflective sheeting 3 of the third embodiment, the boundaries can be made still less conspicuous.

While the present invention has been described above by reference to the first to fifth embodiments as examples, the present invention is not limited thereto.

For example, there may be deviations between the apexes of the respective cube-corner retroreflective elements in the embodiments described above. In this case, the directions of reflected light resulting from reflection by the respective cube-corner retroreflective elements are slightly deviated from the direction of incident light, which results in retroreflection in a manner that the reflected light from the cube-corner retroreflective sheeting as a whole slightly spreads. Such cube-corner retroreflective sheeting therefore has excellent observation angle characteristics.

Figure 17:
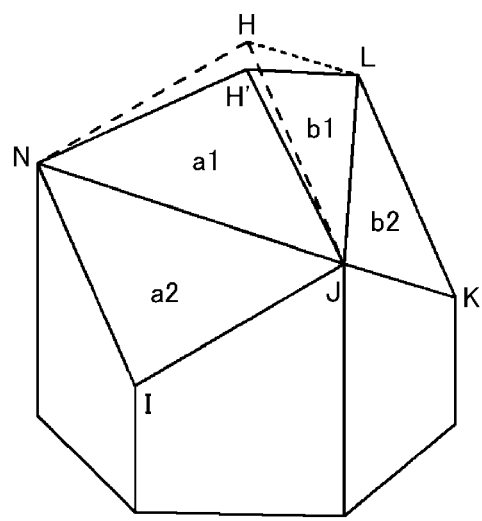
FIG. 17 is a view showing a modified example of a cube-corner retroreflective element.

Moreover, reflective lateral surfaces of the cube-corner retroreflective elements may each be divided into two reflective lateral sub-surfaces, for example, in the embodiments described above. FIG. 17 is a view showing such a modified example of a cube-corner retroreflective element. As shown in FIG. 17, each reflective lateral surface of the retroreflective element is divided into an upper reflective lateral sub-surface and a lower-reflective lateral sub-surface along a line connecting common apexes of only adjacent reflective lateral surfaces, and the upper and lower reflective lateral sub-surfaces are formed in a manner that the sub-surfaces are not on the same plane. Specifically, the reflective lateral surface a shown in FIG. 1 is divided into an upper reflective lateral sub-surface a1 and a lower reflective lateral sub-surface a2 along a line connecting the apexes N and J, the reflective lateral surface b is divided into an upper reflective lateral sub-surface b1 and a lower reflective lateral sub-surface b2 along a line connecting the apexes J and L, and the reflective lateral surface c is divided into an upper reflective lateral sub-surface c1 and a lower reflective lateral sub-surface c2 along a line connecting the apexes L and N. Thus, the position of the original apex H and the position of an apex H' of the cube-corner retroreflective element shown in FIG. 12 are different. According to such as a retroreflective element, since light is reflected by reflective later surfaces a1 and a2 in slightly different directions, light is reflected by the reflective lateral surfaces b1 and b2 in slightly different directions, and light is reflected by the reflective lateral surfaces c1 and c2 in slightly different directions, the direction of the reflected light slightly varies depending on which reflective lateral sub-surface light is reflected by. As a result, retroreflection is produced in a manner that the reflected light from the cube-corner retroreflective sheeting as a whole slightly spreads. Such cube-corner retroreflective sheeting therefore has excellent observation angle characteristics.

While the regions A are adjacent only to the regions B in the embodiments described above, for example, the regions A may be adjacent to other regions having a rotation angle different from those of the regions A and B in addition to the regions B. Alternatively, the regions A may be further adjacent to other regions A in addition to the regions B.

When a region is adjacent to a plurality of regions having rotations angles different from that of the region, the sheeting may be formed to have free designs by making boundary lines conspicuous at some boundaries. In this case, the retroreflective elements in contact with the boundaries made to be conspicuous may be formed not to have retroreflectivity.

Furthermore, the shape of regions may be hexagon, for example. In this case, an outer circumferential side of the hexagon that is a boundary with another region is preferably parallel to a line connecting common apexes of two reflective lateral surfaces in the cube-corner retroreflective element having the hexagonal shape. With such a configuration, settings of boundaries with no gap between regions can be made easy. Similarly, the shape of regions may be a shape other than a hexagon.

Furthermore, the hexagonal cube-corner retroreflective elements in the respective embodiments may be combined.

INDUSTRIAL APPLICABILITY

According to the present invention, cube-corner retroreflective sheeting that is excellent in rotation angle characteristics and excellent in design is provided.

DESCRIPTION OF REFERENCE NUMERALS 1, 2, 3, 4, 5 . . . cube-corner retroreflective sheeting
11, 12 . . . hexagonal cube-corner retroreflective element
11s to 11v, 12s to 12v . . . cube-corner retroreflective element
21, 22 . . . hexagonal cube-corner retroreflective element
21s, 21t, 22s, 22t cube-corner retroreflective element
A, B . . . region
H to N, P, Q, T to V . . . apex
HJ, HL, HN . . . edge line (side)
IJ, JK, KL, LM, MN, NI . . . outer circumferential side
a, b, c, a', b', c', a", b", c" . . . reflective lateral surface
a1, b1, c1 . . . upper reflective lateral sub-surface
a2, b2, c2 . . . lower reflective lateral sub-surface

The invention claimed is:

1. A cube-corner retroreflective sheeting having a plurality of regions in which cube-corner retroreflective elements having predetermined rotation angle characteristics are arranged in a closest-packed state, wherein
the respective cube-corner retroreflective elements in at least two mutually adjacent regions are rotated with each other around an axis perpendicular to the sheeting, each of the regions including a cube-corner retroreflective element that is not in contact with a boundary between the regions and a cube-corner retroreflective element that is in contact with the boundary between the regions,
the cube-corner retroreflective element that is not in contact with respective boundaries between the regions provides three quadrangular reflective lateral surfaces perpendicular to one another having one apex in common, such cube-corner retroreflective element having three edge lines each being one common side of the mutually adjacent reflective lateral surfaces and having a hexagonal shape by sides of the respective reflective lateral surfaces that are not common sides of mutually adjacent reflective lateral surfaces,
the cube-corner retroreflective element that is in contact with the respective boundaries between the regions has a quadrangular or pentagonal shape obtained by cutting part of one or two quadrangular reflective lateral surfaces of the cube-corner retroreflective element having the hexagonal shape to form the reflective lateral surface in a triangular shape, and
only the triangular reflective lateral surface that is partly cut off is in contact with the boundary between the regions.

2. The cube-corner retroreflective sheeting according to claim 1, wherein a surface in contact with the boundary in each cube-corner retroreflective element in contact with the boundary is a surface formed of a triangle obtained by cutting the reflective lateral surface along a line connecting common apexes of only two reflective lateral surfaces, the apexes being opposed to each other.

3. The cube-corner retroreflective sheeting according to any one of claim 1 or 2, wherein only one reflective lateral surface of each of the cube-corner retroreflective elements in contact with the boundary is in contact with the boundary.

4. The cube-corner retroreflective sheeting according to any one of claim 1 or 2, wherein two reflective lateral surfaces of each of the cube-corner retroreflective elements in contact with the boundary are in contact with the boundary.

5. The cube-corner retroreflective sheeting according to any one of claim 1 or 2, wherein only one reflective lateral surface of each of some cube-corner retroreflective elements in contact with the boundary is in contact with the boundary, and two reflective lateral surfaces of each of some other cube-corner retroreflective elements in contact with the boundary are in contact with the boundary.

6. The cube-corner retroreflective sheeting according to any one of claim 1 or 2, wherein the boundary is parallel to a line connecting common apexes of only two reflective lateral surfaces of the cube-corner retroreflective element having the hexagonal shape.

7. The cube-corner retroreflective sheeting according to any one of claim 1 or 2, wherein the three edge lines of the cube-corner retroreflective element having the hexagonal shape have the equal length to one another.

8. The cube-corner retroreflective sheeting according to claim 7, wherein the cube-corner retroreflective elements having the hexagonal shape in mutually adjacent regions rotate relative to each other by an odd multiple of 60 degrees around an axis perpendicular to the sheeting.

9. The cube-corner retroreflective sheeting according to any one of claim 1 or 2, wherein at least one out of the three edge lines of the cube-corner retroreflective element having the hexagonal shape have a length different from those of the other edge lines.

10. The cube-corner retroreflective sheeting according to claim 9, wherein the cube-corner retroreflective elements having the hexagonal shape in mutually adjacent regions rotate relative to each other by 180 degrees around an axis perpendicular to the sheeting.

11. The cube-corner retroreflective sheeting according to any one of claim 1 or 2, wherein apical angles of the cube-corner retroreflective elements in respective regions are deviated.

12. The cube-corner retroreflective sheeting according to any one of claim 1 or 2, wherein at least one of the quadrangular reflective lateral surfaces is divided into an upper reflective lateral sub-surface and a lower reflective lateral sub-surface along a line connecting common apexes of only two of the quadrangular reflective lateral surfaces with each other, and the upper reflective lateral sub-surface and the lower reflective lateral sub-surface are not on the same plane as each other.

* * * * *